(12) United States Patent
Xiang

(10) Patent No.: US 11,647,732 B2
(45) Date of Patent: May 16, 2023

(54) PET STROLLER

(71) Applicant: Yuanzhen Xiang, Alhambra, CA (US)

(72) Inventor: Yuanzhen Xiang, Alhambra, CA (US)

( * ) Notice: Subject to any disclaimer, the term of this patent is extended or adjusted under 35 U.S.C. 154(b) by 196 days.

(21) Appl. No.: 17/067,591

(22) Filed: Oct. 9, 2020

(65) Prior Publication Data

US 2021/0022314 A1 Jan. 28, 2021

Related U.S. Application Data

(63) Continuation-in-part of application No. 16/007,975, filed on Jun. 13, 2018, now Pat. No. 10,946,885.

(60) Provisional application No. 62/555,615, filed on Sep. 7, 2017.

(51) Int. Cl.
| | | |
|---|---|---|
| *A01K 1/02* | (2006.01) | |
| *B62B 7/06* | (2006.01) | |
| *B62B 9/14* | (2006.01) | |
| *B62B 9/20* | (2006.01) | |

(52) U.S. Cl.
CPC ............ *A01K 1/0254* (2013.01); *B62B 7/062* (2013.01); *B62B 9/142* (2013.01); *B62B 9/203* (2013.01); *B62B 2202/42* (2013.01); *B62B 2206/02* (2013.01)

(58) Field of Classification Search
CPC .......... A01K 1/0254; B62B 9/12; B62B 9/14; B62B 9/203; B62B 9/26; B62B 2206/04; B62B 2202/42; B62B 9/142; B62B 9/145
See application file for complete search history.

(56) References Cited

U.S. PATENT DOCUMENTS

| | | | | |
|---|---|---|---|---|
| 4,796,565 A | * | 1/1989 | Charbeneau | A01K 1/0245 119/727 |
| 5,113,793 A | * | 5/1992 | Leader | A01K 1/0245 119/497 |
| 6,223,691 B1 | * | 5/2001 | Beattie | A45C 13/385 119/479 |
| 6,374,775 B1 | * | 4/2002 | Baumsteiger | A01K 1/0245 280/47.38 |
| 6,584,937 B1 | * | 7/2003 | Ludolph | A01K 1/0245 119/500 |
| 6,786,181 B1 | * | 9/2004 | Leanheart | A01K 1/0236 119/474 |
| 6,866,008 B1 | * | 3/2005 | Havard | B62B 7/00 280/47.38 |

(Continued)

*Primary Examiner* — Trinh T Nguyen
(74) *Attorney, Agent, or Firm* — Tsz Lung Yeung

(57) ABSTRACT

A pet stroller includes a canopy fabric, a supporting frame, a first longitudinal frame, a second longitudinal frame, a rear wheel frame, and a plurality of wheels. The supporting frame includes a carriage body which has an accommodating cavity and a front opening. The supporting frame includes a main supporting frame, an adjustable supporting frame and a utility frame extended from the main supporting frame to a position corresponding to the front opening of the carriage body for allowing pet's access. When the adjustable supporting frame is in a lying position, the adjustable supporting frame is pivotally moved to substantially align with the main supporting frame for maximizing a volume of the accommodating cavity. When the adjustable supporting frame is in the first inclined position, it is pivotally moved to inclinedly and upwardly extended from the main supporting frame for reducing a size of the accommodating cavity.

20 Claims, 15 Drawing Sheets

(56) References Cited

U.S. PATENT DOCUMENTS

| | | | | |
|---|---|---|---|---|
| 6,913,271 | B2* | 7/2005 | Gordon | A01K 1/0236 |
| | | | | 297/484 |
| 7,090,242 | B1* | 8/2006 | Sheinall | A01K 1/0245 |
| | | | | 280/657 |
| 7,261,060 | B1* | 8/2007 | Garofola | A01K 1/0236 |
| | | | | 119/482 |
| 7,377,527 | B2* | 5/2008 | Cunningham | B62B 3/12 |
| | | | | 280/47.38 |
| 10,517,265 | B2* | 12/2019 | Lin | A01K 1/0236 |
| 2004/0065270 | A1* | 4/2004 | King | A01K 1/0236 |
| | | | | 119/496 |
| 2005/0166861 | A1* | 8/2005 | King | A01K 1/0245 |
| | | | | 119/496 |
| 2006/0169218 | A1* | 8/2006 | Chang | A01K 1/0236 |
| | | | | 119/496 |
| 2006/0284392 | A1* | 12/2006 | Chen | A01K 1/0236 |
| | | | | 280/47.38 |
| 2007/0169719 | A1* | 7/2007 | Chang | A01K 1/0254 |
| | | | | 119/496 |

\* cited by examiner

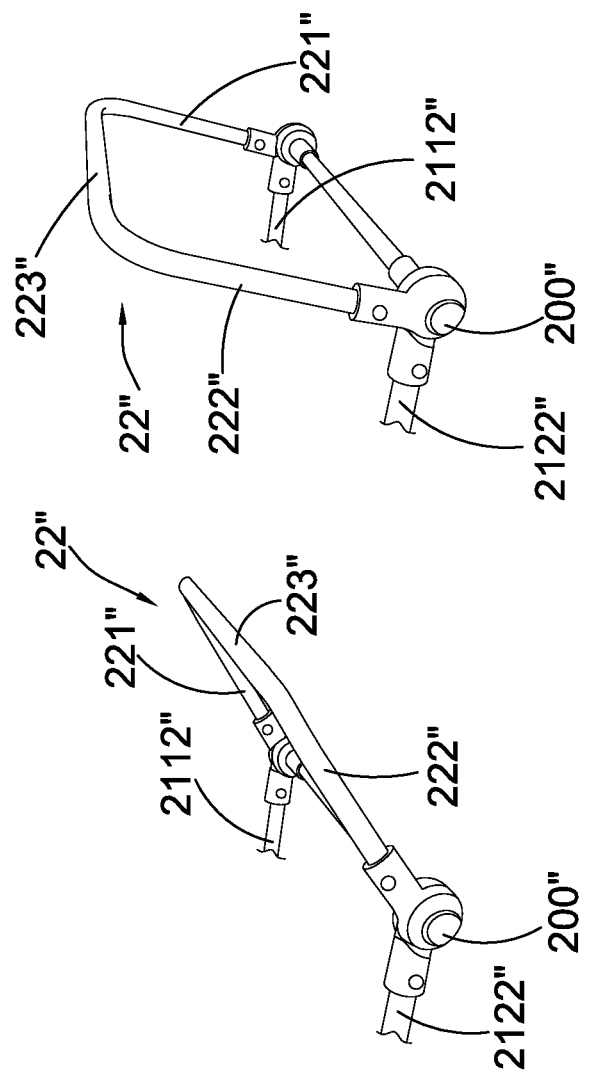
FIG.12
FIG.11
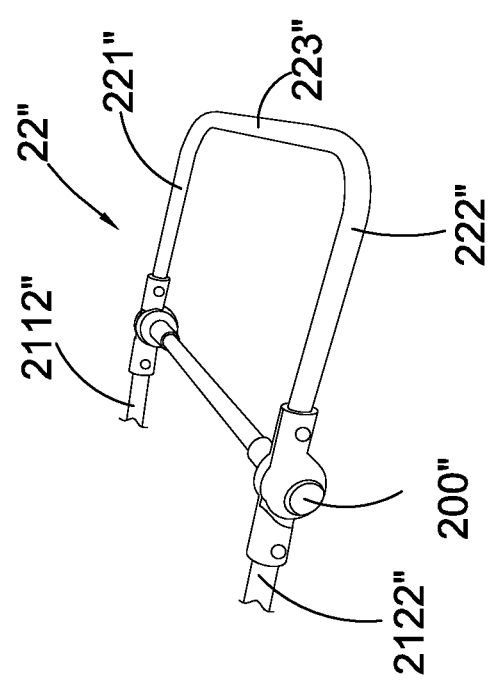
FIG.10

PET STROLLER

CROSS REFERENCE TO RELATED APPLICATION

This is a Continuation-In-Part application of a non-provisional application having an application number of Ser. No. 16/007,975, and a filing date of Jun. 13, 2018, which is non-provisional application of a provisional application having an application No. of 62/555,615 and a filing date of Sep. 7, 2017, the entire contents of these applications are hereby incorporated by reference.

BACKGROUND OF THE PRESENT INVENTION

Field of Invention

The present invention related to a pet stroller, and more particularly to a multi-function pet stroller which not only provides an easy-to-latch canopy, but also provide an adjustable carriage portion to accommodate variable sizes of animals.

Description of Related Arts

A conventional pet stroller comprises a frame body, and a cloth and mesh coupled on the frame body to provide a carriage for accommodate the animals and a convertible canopy for providing a shade to the animals. However, the convertible pet stroller has several drawbacks.

The canopy having a mesh which is adapted to connect with an upper periphery of the carriage to confine the animal inside the carriage without having to be tied or clipped by a lead. In other words, the mesh is zipped, clipped, or buckled to the upper periphery of the carriage, and can be moved between an opened and closed position. In addition, the mesh also can be attached on the carriage by loop and hook fastener (Velcro) or magnetic member. However, the user need to spend time to clip or buckle the mesh to confine the animals inside the carriage, and at the same time the animals may usually jump or climb for getting out of the carriage, so it is hassle for the user to fasten the mesh with the carriage. In other words, when the clips, buckles, Velcro, and magnetic members are broken after constantly use, the user needs to purchase additional accessories to replace them.

Secondly, the conventional pet stroller doesn't provide a ventilation device. Even if the mesh is a ventilation material, the canopy is usually required to close to prevent the animals trying to getting out of the carriage, so the temperature inside the carriage is always very high during summer time. Therefore, the ventilation devices, such as air condition or electronic fans, are highly desired to install inside the carriage.

Thirdly, the space of the carriage of the conventional pet stroller is fixed. The pet stroller for a small size animal generally does not fit to carry a large size animal. Although a large size pet stroller is convenient for accommodating both small and large sizes of animals, it is bulky too. In addition, it is not enough space for using the conventional pet stroller in a narrow way or alley, and especially the conventional pet stroller is required to turn around.

Fourthly, rear wheel assembly of the conventional pet stroller usually comprises two rear wheels and one rear wheel axis assembly, and the rear wheel assembly is coupled with through a plurality of steps. In other words, additional supplemental tools are required to detach and attach the rear wheels. Therefore, not only the user needs to spend lot of time to assemble or disassemble the rear wheels, but also the rear wheels and the rear wheel axis assembly are easy to be broken during the installation.

SUMMARY OF THE PRESENT INVENTION

Certain variations of the present invention provide a pet stroller comprising a utility frame for supporting pet food, wherein a pet carried by the pet stroller may be able to gain access to the pet food without needing to leave the pet stroller.

Certain variations of the present invention provide a pet stroller which may be folded to a compact size, wherein the utility frame may be slid out for use as a handle for conveniently carrying or pushing the pet stroller when it is not in use.

In one aspect of the present invention, it provides a pet stroller for accommodating at least a pet, comprising:

a canopy fabric comprising a carriage body and a canopy body connected to the carriage body, the carriage body having a foldable bottom panel, an accommodating cavity for accommodating the pet, and a front opening communicating the accommodating cavity with an exterior of the carriage body;

a supporting frame assembly which comprises a main supporting frame, an adjustable supporting frame pivotally connected and rearwardly extended from the main supporting frame to move between at least a lying position and a first inclined position, and a utility frame extended from the main supporting frame to a position corresponding to the front opening of the carriage body for allowing the pet to have access to the utility frame through the front opening, the carriage body of the canopy fabric being supported on the main supporting frame and the adjustable supporting frame;

a first longitudinal frame pivotally connected to the supporting frame assembly at a first side of the main supporting frame, the first longitudinal frame having a first upper portion and a first lower portion;

a second longitudinal frame pivotally connected to the supporting frame assembly at a second side of the main supporting frame, the first side and the second side being opposite to each other, the second longitudinal frame having a second upper portion and a second lower portion;

a rear wheel frame supported by the supporting frame assembly and rearwardly extended from the first longitudinal frame and the second longitudinal frame;

a plurality of wheels rotatably connected to the first lower portion of the first longitudinal frame, the second lower portion of the second longitudinal frame, and the rear wheel frame;

wherein when the adjustable supporting frame is in the lying position, the adjustable supporting frame is pivotally moved to substantially align with the main supporting frame while the foldable bottom panel of the carriage body is arranged to lie substantially flat on the main supporting frame and the adjustable supporting frame for maximizing a volume of the accommodating cavity, wherein when the adjustable supporting frame is in the first inclined position, the adjustable supporting frame is pivotally moved to inclinedly and upwardly extended from the main supporting frame for reducing a size of the accommodating cavity.

This summary presented above is provided merely to introduce certain concepts and not to identify any key or essential features of the claimed subject matter.

BRIEF DESCRIPTION OF THE DRAWINGS

FIG. 10 is a perspective view of an adjustable supporting frame of the pet stroller according to the second preferred embodiment of the present invention, illustrating that the adjustable supporting frame is in a lying position.

FIG. 11 is a perspective view of an adjustable supporting frame of the pet stroller according to the second preferred embodiment of the present invention, illustrating that the adjustable supporting frame is in a second inclined position.

FIG. 12 is a perspective view of an adjustable supporting frame of the pet stroller according to the second preferred embodiment of the present invention, illustrating that the adjustable supporting frame is in a second inclined position.

DETAILED DESCRIPTION OF THE PREFERRED EMBODIMENT

Figure 1:
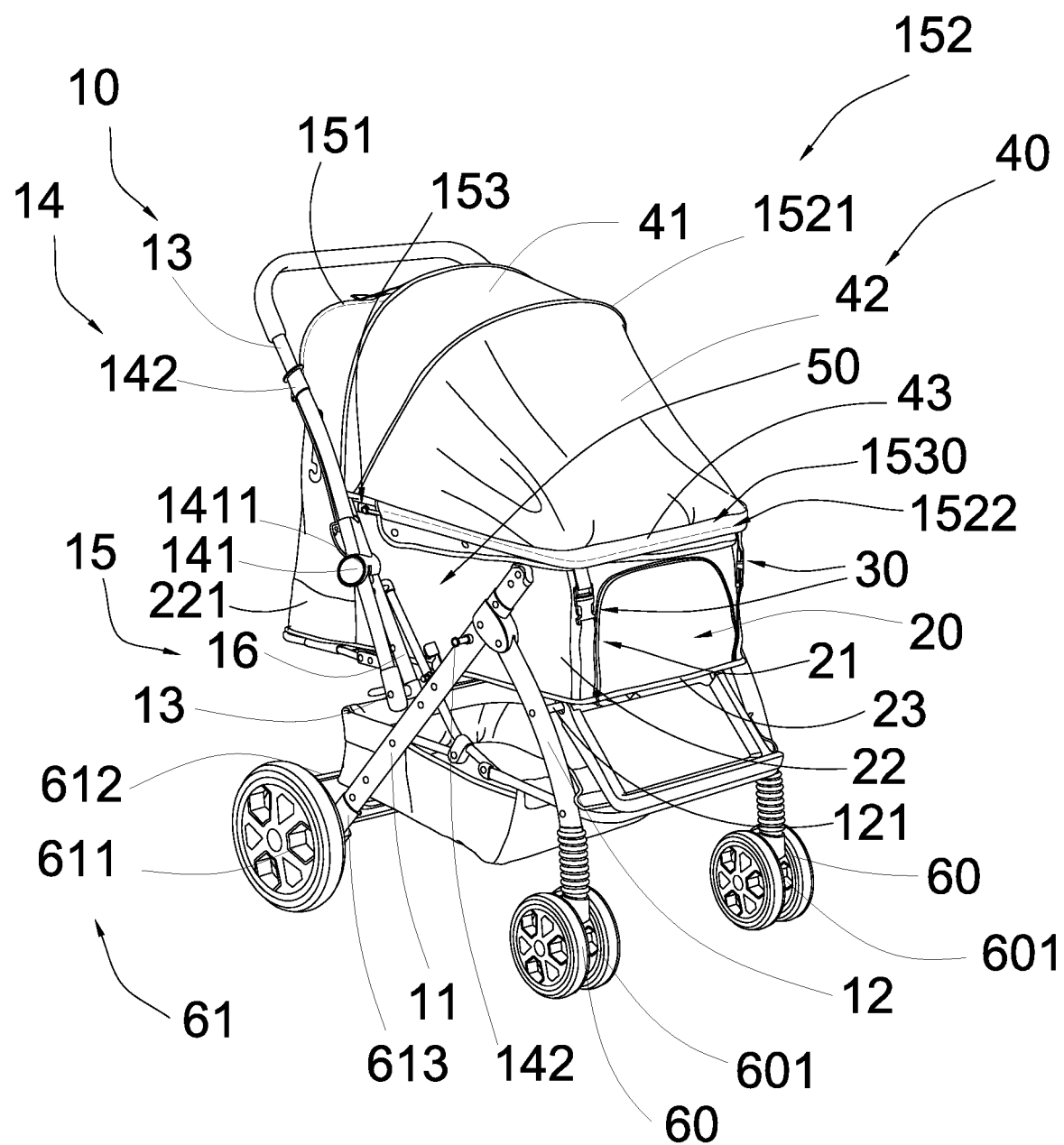
FIG. 1 is a perspective view of a pet stroller according to a first preferred embodiment of the present invention.

The following detailed description of the preferred embodiment is the preferred mode of carrying out the invention. The description is not to be taken in any limiting sense. It is presented for the purpose of illustrating the general principles of the present invention.

It should be appreciated that the terms "install", "connect", "couple", and "mount" in the following description refer to the connecting relationship in the accompanying drawings for easy understanding of the present invention. For example, the connection can refer to permanent connection or detachable connection. Furthermore, "connected" may also mean direct connection or indirect connection, or connection through other auxiliary components. Therefore, the above terms should not be an actual connection limitation of the elements of the present invention.

It should be appreciated that the terms "length", "width", "top", "bottom", "front", "rear", "left", "right", "vertical", "horizontal", "upper", "lower", "exterior", and "interior" in the following description refer to the orientation or positioning relationship in the accompanying drawings for easy understanding of the present invention without limiting the actual location or orientation of the present invention. Therefore, the above terms should not be an actual location limitation of the elements of the present invention.

It should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

Referring to FIG. 1 to FIG. 4 of the drawings, a pet stroller according to a first preferred embodiment of the present invention is illustrated, wherein the pet stroller comprises a frame body 10, a front and a rear wheel assembly 60, 61 detachably coupled with the frame body 10, a carriage body 20 supported by the frame body 10 for accommodating at least an animal therein, and a canopy body 40 supported by the frame body 10 to cover the carriage body 20 and confine the animal inside the carriage body 20.

Accordingly, the frame body 10 comprises two rear wheel struts 11, two front wheel struts 12 pivotally coupled with the two rear wheel struts 11 respectively, a handle frame 13 having a U-shape and two free ends pivotally attached on the two rear wheel struts 11 respectively by two strut pivots 13, two locking assemblies 14 operatively located at the handle frame 13 to activate the handle frame 13 to move between a forward position and a rearward position, and a supporting frame assembly 15 operatively connected with the two front and rear wheel struts 11, 12 to support the carriage body 20 to form a resting cavity 21.

The supporting frame assembly 15 comprises a U-shaped folding frame 16 pivotally associated with the handle frame 13 and the rear wheel struts 11 by a folding and unfolding mechanism 50 on either side of the handle frame 13 and each of the two rear wheel struts 11, wherein the folding and unfolding mechanism 50 can be operated to move the frame body 10 to operate between a folding position and an unfolding position.

According to the first preferred embodiment of the present invention, each of the two locking assemblies 14 comprises a pair of locker member 141 slidably arranged on the U-shaped handle frame 13, and a pair of rear protrusions 142 and front protrusions 143 formed on the folding frames 16 and the two rear wheel struts 11 respectively to selectively engage with the locker member 141, wherein each of the locker members 141 comprises a front locking groove 1411 and a rear locking groove 1412 formed on a bottom portion of the locker member 141. Each of the two locking assemblies 14 further comprises a slide actuator 142 slidably attached on the folding frame 16, a wire 143, and a spring 144 deposited inside the locker member 141, wherein the slide actuator 142 is operatively linked with the locker member 141 respectively through the wire 143. In other words, one end of the wire 143 is connected with the slide actuator 142, and the other end of each of the wire 143 is connected with the spring 144.

It is worth mentioning that the locker member 141 is driven to move along the folding frame 16 via the slide actuators 142. When the slide actuator 142 is upwardly pulled along with the folding frame 16 as well as the spring 144 is extended by a pulling force provided by the slide actuators 142, the locker member 141 is synchronously moving towards the slide actuator 142. On the other hand, when the slide actuator 142 is not activated, which is that no pulling force is exerted thereon, the spring 144 reinstates to its original shapes, and then the locker member 141 is driven to return at its original position, and at the same time, the slide actuator 142 synchronously and downwardly moves along the folding frame 16 to reach its original position.

Since the U-shaped handle frame 13 is operated between the forward position and the rearward position, the rear protrusion 143 is engaged with the rear locking groove 1412 of the locker member 141 in order to lock the U-shaped handle frame 13 in the forward position. Therefore, the slide actuator 142 is upwardly pulled to drive the locker member 141 for moving upwardly along the folding frame 16 in order to disengage the connection between the rear protrusion 143 and the rear locking groove 1412. In other words, the front protrusion 142 is engaged with the front locking groove 1411 of the locker member 141 in order to lock the U-shaped handle frame 16 in the rearward position. Therefore, the slide actuator 142 is upwardly pulled to drive the locker member 141 for moving upwardly along the folding frame 16 in order to disengage the connection between the front protrusion 142 and the front locking groove 1411.

The pet stroller further comprises two detachable front wheels 60 and a detachable rear wheel assembly 61, wherein each of the front wheels 60 comprises a press button 601 operatively associated with a free end of said front wheel strut 12. Each of the front wheels 60 further comprises an elongated slot 602 for engaging with the free end of the front wheel strut 12 to affix the front wheel 60 with the front wheel strut 12, wherein the press button 601 is able to press for releasing the front wheel 60 from the front wheel strut 12, and press for attaching the front wheel 60 with the front wheel strut 12. In other words, the rear wheel assembly 61 also can be detachably connected with each of a free end of the rear wheel strut 11, wherein the rear wheel assembly 61 comprises two rear wheels 611 associated with each other through a supporting frame 612, wherein the supporting frame 612 comprises two vertically arranged sleeves 613 adapted for engaging with the free end of the rear wheel strut 11. Therefore, the free ends of the two rear wheel struts 11 are coupled with the sleeves 613 to affix the rear wheel assembly 61 with the rear wheel strut 11.

The pet stroller is able to operate between a compact storage position and an extended position, wherein the press bar 521 is pressed to activate the pet stroller for performing the compact storage position. After the press bar 521 is pressed, the folding and unfolding mechanism is slid downwardly along the rear wheel strut 11, and then the folding frame 16 and the U-shaped handle frame 13 are moved to overlap with the rear wheel strut 11, and at the same time, the front wheel strut 12 is pivotally moved towards the rear wheel strut 11 for overlapping with the rear wheel strut 11. In order to open the pet stroller in the extended position, the U-shaped handle frame 13 is lifted upwardly, and then the press bar 521 can be pressed to locate the folding and unfolding mechanism in a position where the folding frame 16 and the U-shaped handle frame 13 are overlapped with each other, and at the same position, the hook-shaped locker 53 can be engaged with the retainer 522 to affix the pet stroller in the extended position. Therefore, the pet stroller of the present invention has an easy to fold and unfold structure. In other words, the press bar 521 is adapted to guide the pet stroller to perform a compact storage position and the extended position, so the user only need to easily press the press bar 521 in order to guide the configuration of the pet stroller in the compact storage position or the extended position.

The supporting frame assembly 15 further comprises an upper supporting frame 151, which is a top U-shaped portion of the folding frame transversely extended between two lower members of folding frame 16, and supported by the rear wheel strut 11, a platform frame 153 and a canopy frame 152. The platform frame 153 comprises a carriage supporting member having a U-shape and two ends rigidly connected to the folding frame 16 and extended frontwardly to support the carriage body 20 and an extension frame 1531 which is pivotally connected to the folding frame 16 and operatively linked with the folding and unfolding mechanism 50.

The canopy frame 152 comprises one or more C-shaped upper canopy bars 1521 and a U-shaped lower canopy enclosure bar 1522, pivotally associated with the folding frame 16 and the upper supporting frame 151 respectively, wherein the upper canopy bar 1521 and the lower canopy enclosure bar 1522 are pivotally connected to the folding frame 16, in such a manner that both of the one or more upper canopy bars 1521 and the lower canopy enclosure bar 1522 are operated to pivotally move between the carriage supporting member 1530 and the upper supporting frame 151, that is to be operated to move towards the upper supporting frame 151 or selectively move towards the lower canopy enclosure bar 1522.

The folding and unfolding mechanism 50 comprises a pair of main bases 51 each having a serrated slot 511 and attached on the folding frame 16, and a pair of pivot members 52 each having a middle portion pivotally connected with the folding frame 16. Each of the pivot members 52 further comprises a press bar 521 extended through one side of the respective pivot member 52 to the other side thereof. Since each of the pivot members 52 is pivotally connected with the inclined member 16, the press bar 521 can be downwardly pressed to move the pivot member 52 relative to the folding frame 16. The folding and unfolding mechanism 50 further comprises a hook-shaped locker 53 attached on each of the rear wheel struts 11, wherein the hook-shaped locker 53 is pivotally connected with the rear wheel struts 11 to selectively engage with a retainer 522 of the pivot member 52 for locking the pivot member 52 in an affixed position. Therefore, while the pivot member 52 is locked in the affixed position, the folding frame 16, the rear wheel struts 11, and the front wheel struts 12 are synchronously locked in the unfolding position. In that unfolding position, the rear wheel struts 11 and the front wheel struts 12 are biased against a ground to support the pet stroller standing thereon.

Figure 3:
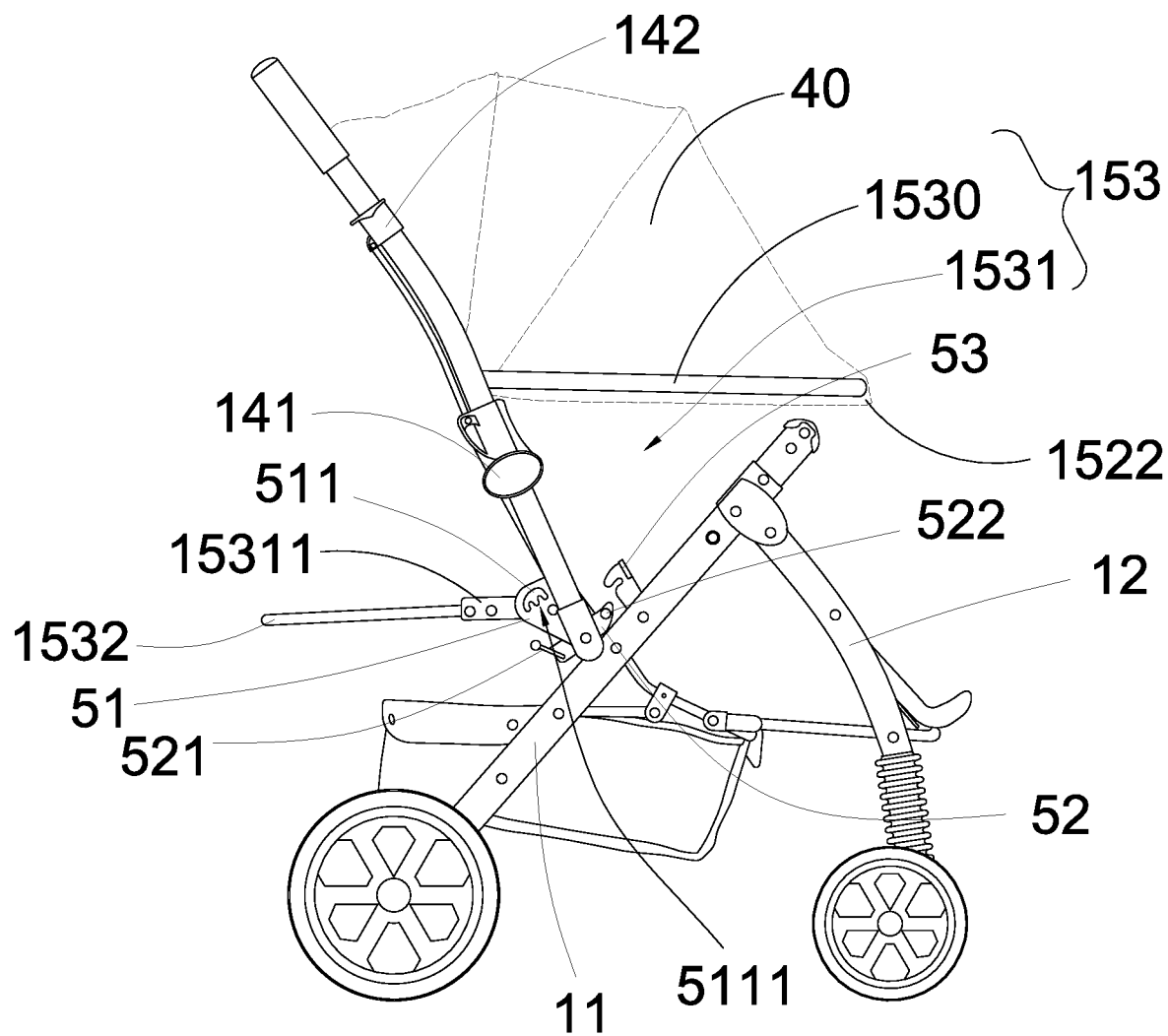
FIG. 3 is a side schematic view illustrating the frame body of the pet stroller according to the first preferred embodiment of the present invention.
Figure 4:
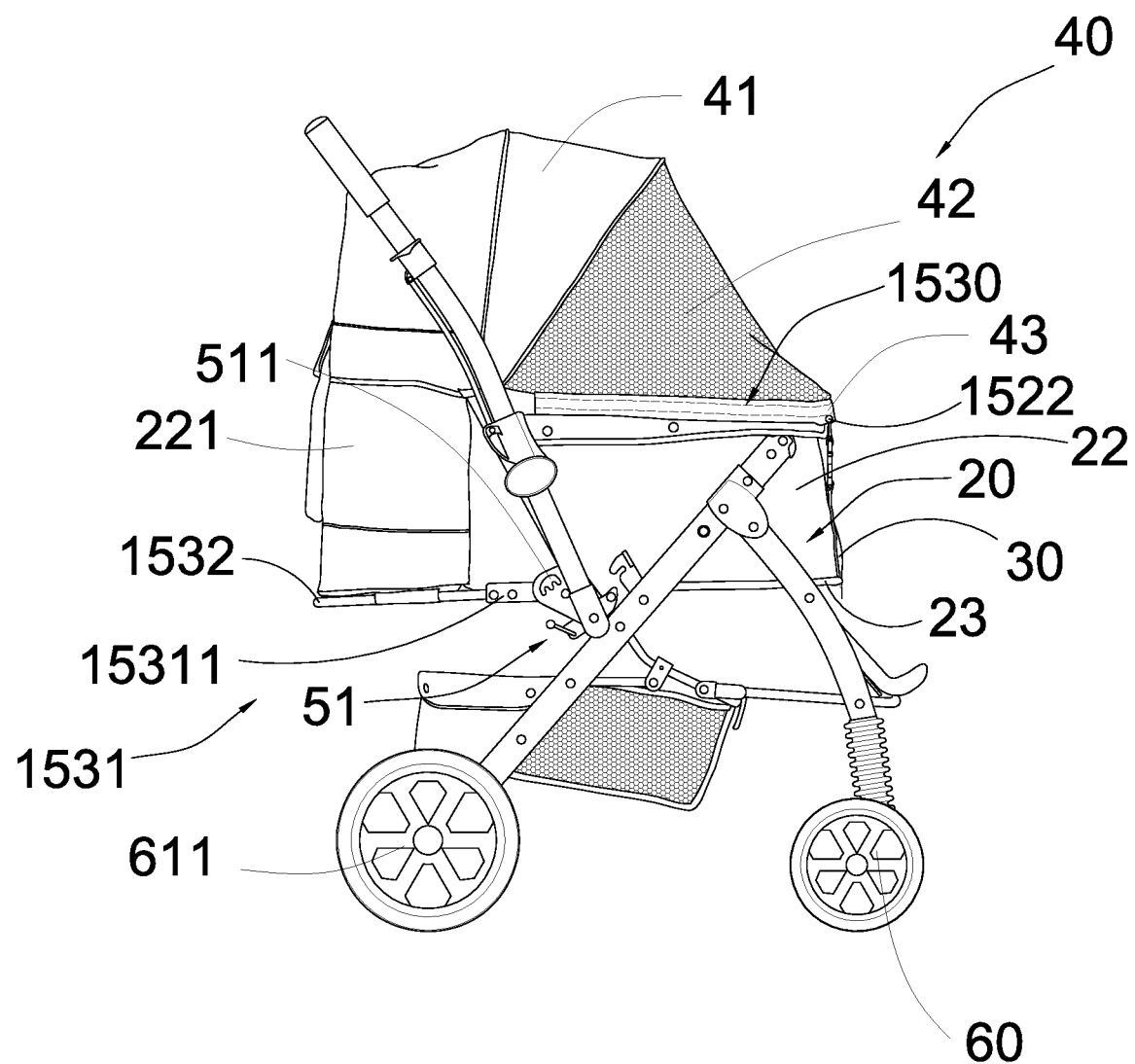
FIG. 4 is a side view of the pet stroller according to the first preferred embodiment of the present invention.

Accordingly, the canopy body 40 comprises a ceiling portion 41, which can be made of clothing material such as woven or non-woven textile, detachably coupled to the folding frame 16 and supported by the upper supporting frame 151 and the one or more upper canopy bars 1521. The canopy body 40 further comprises a front portion 42 integrally extended from the ceiling portion 41 to the lower canopy enclosure bar 1522, wherein the front portion 42 can be made of clothing material as shown in FIG. 1 or mesh material as shown in FIG. 4 for air ventilation. Alternatively, the entire canopy body 40 can be all cloth or all mesh. In addition, the canopy body 40 further has an enclosure portion 43 integrally extended from the front portion 42 with the lower canopy enclosure bar 1522 being covered and enclosed therein. In other words, the one or more upper canopy bars 1521 are received in the canopy body 40 and the lower canopy enclosure bar 1522 is received in the enclosure portion for retracting or extending the canopy body 40 between a retracted position where the lower canopy enclosure bar 1522 and the one or more upper canopy bars 1521 are moving towards and resting at the upper supporting frame 151 (as shown in FIG. 2) or an extended position where the lower canopy enclosure bar 1522 is moving towards and engaging with the carriage supporting member 1530 (as shown in FIGS. 1, 3 and 4).

It is worth mentioning that the lower canopy enclosure bar 1522 is received in the enclosure portion 43, and a size of the U-shaped lower canopy enclosure bar 1522 is slightly larger than a size of the U-shaped upper supporting frame 151. Accordingly, when the lower canopy enclosure bar 1522 received in the enclosure portion 43 is moved toward the carriage supporting member 1530 to extend the canopy body 40 to cover the resting cavity 21 of the carriage body 20, as shown in FIGS. 1 and 4, the lower canopy enclosure bar 1522 can be further moved downward over the carriage supporting member 1530 until the enclosure portion 42 of the canopy body 40 and the lower canopy enclosure bar 1522 therein are positioned below the carriage supporting member 1530, so that the lower canopy enclosure bar 1522 and the carriage supporting member 1530 are engaged to lock the extended position of the canopy body 40 in position for preventing the animal in the resting cavity from coming out.

In other words, according to the first preferred embodiment of the present invention, the lower canopy enclosure bar 1522 is arranged to be able to shut up canopy body 40 with the carriage body 20 and to enclose the resting cavity 21 by the canopy body 40. In order to further ensure the enclosure of the resting cavity 21, the pet stroller of the present invention further comprises a locking mechanism 30, as shown in FIGS. 1, 2 and 4, which comprises at least one first member 31 connected to a front edge of the enclosure portion 43 of the canopy body 40 a second member 32 connected to a front side of the platform enclosure 22, and connector 33 detachably connected between the first and second members 31, 32. The connector 33 can be embodied as a buckle device having a male buckle and a female buckle connected to the first and second members 31, 32 respectively so that when the male and female buckles are buckled together the canopy body 40 is further fastened with the carriage body 20.

Figure 2:
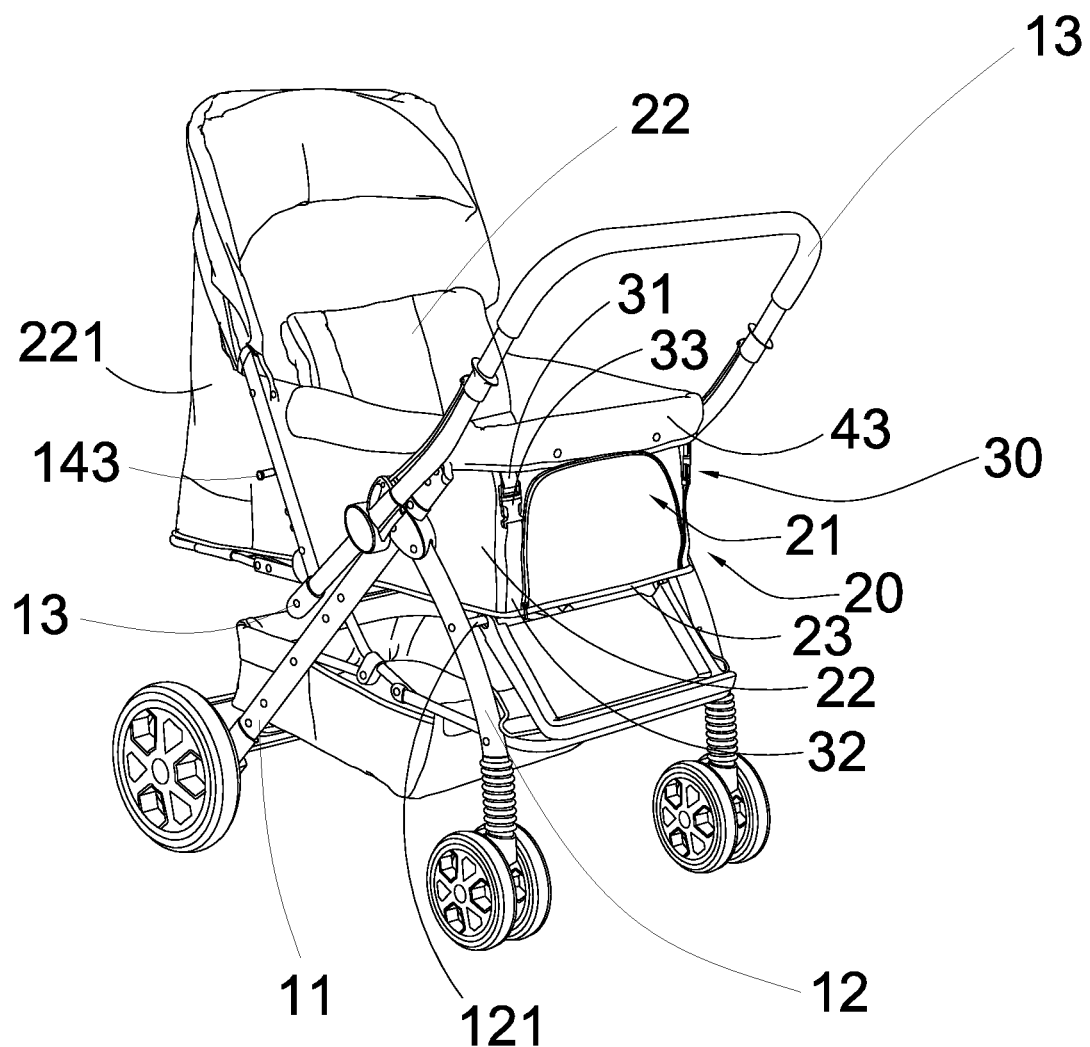
FIG. 2 is a schematic view of the pet stroller according to the first preferred embodiment of the present invention, illustrating that a canopy body is on a retracted position.

Referring to FIGS. 1 and 2 of the drawings, a base bar 121 is connected between the two front wheel struts 12 to form a bottom support to the carriage body 20. Referring to FIGS. 1, 2 and 4, the carriage body 20 comprises a platform enclosure 22 having an upper portion supported by the carriage supporting member 1530 to integrally and downwardly extend from the carriage supporting member 1530 and a base panel 23 provided at a bottom of the platform enclosure 22 which is supported by the base bar 121 to define the resting cavity 21 within the platform enclosure 22 and on top of the base panel 23 where one or more animals can stay therein. The canopy body 40 is a shield to confine the animal inside the resting cavity 21 while the canopy body 40 is in the extended position. It is worth mentioning that the base board 22 is adapted to provide a rigid platform to the animal for resting thereon and the carriage body 20 can be made of woven or non-woven textile, wherein the carriage body 20 is folded while the frame body 10 is in the folding position. And, in other words, the carriage body 20 is unfolded along with the base panel 23 forming the platform, while the frame body 10 is in the unfolding position.

The extension frame 1531 of the platform frame 153 comprises a base member 15311, a U-shaped pivotal frame 1532 transversely extended from the base member 15311, and an actuator member 15312, such that the base member 15311 is arranged to be selectively engaged within one of the locking recesses 5111 of the serrated slot 511 defined in the main base 51, in form of W shape, by means of the actuator member 15312. The actuator member 15312 is arranged to be capable of activating the base member 15311 to selectively engage with the main base 51 so as to fold up the pivotal frame 1532 towards the folding frame 16 to a folding position or to unfold the pivotal frame 1532 downwards to a horizontal unfolding position. According to the first preferred embodiment, the actuator member 15312 is able to activate the base member 15311 to move arcuately in the serrated slot 511, so that the U-shaped pivotal frame 1532 can be placed into a different angular position inclined relative to the folding frame 16 or a horizontal position as shown in FIGS. 1 to 4 so as to extend the carriage body 20 rearwardly to further enlarge the resting cavity 21 of the carriage body 20.

Figure 5:
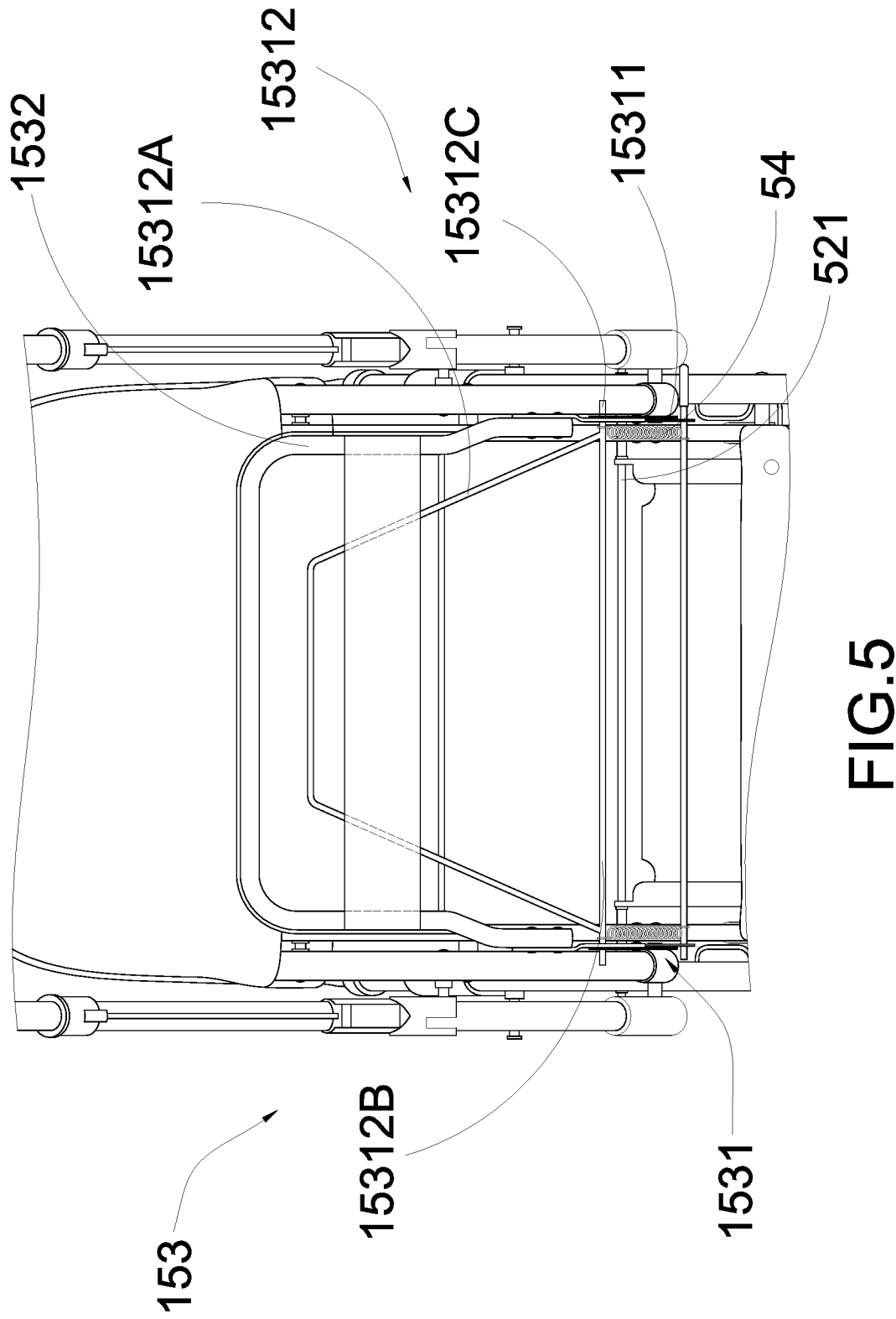
FIG. 5 is a rear view of the pet stroller according to the first preferred embodiment of the present invention.
Figure 6A:
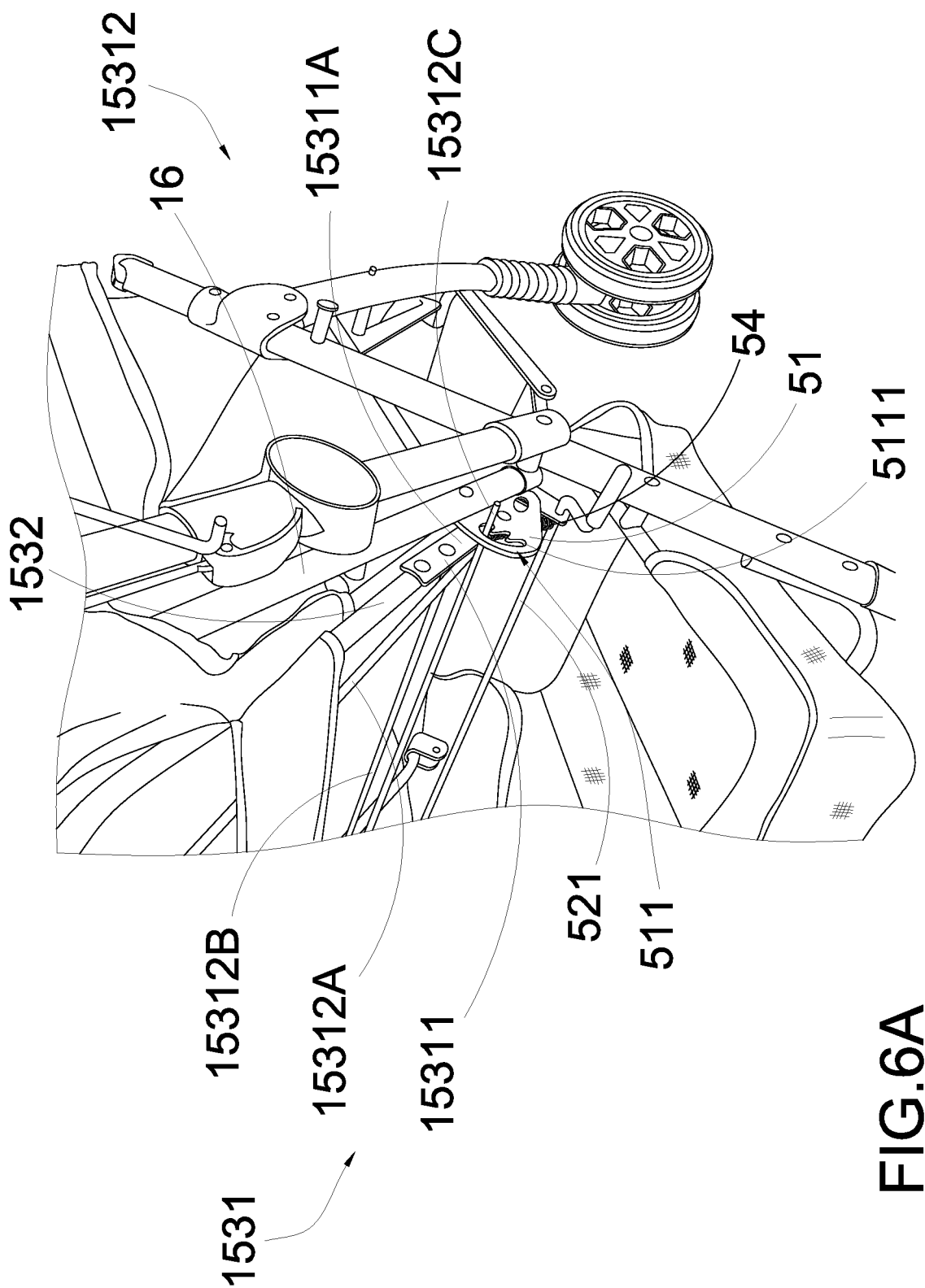
FIG. 6A is a schematic view illustrating the pivotal frame of the pet stroller in folded position according to the first preferred embodiment of the present invention.
Figure 6B:
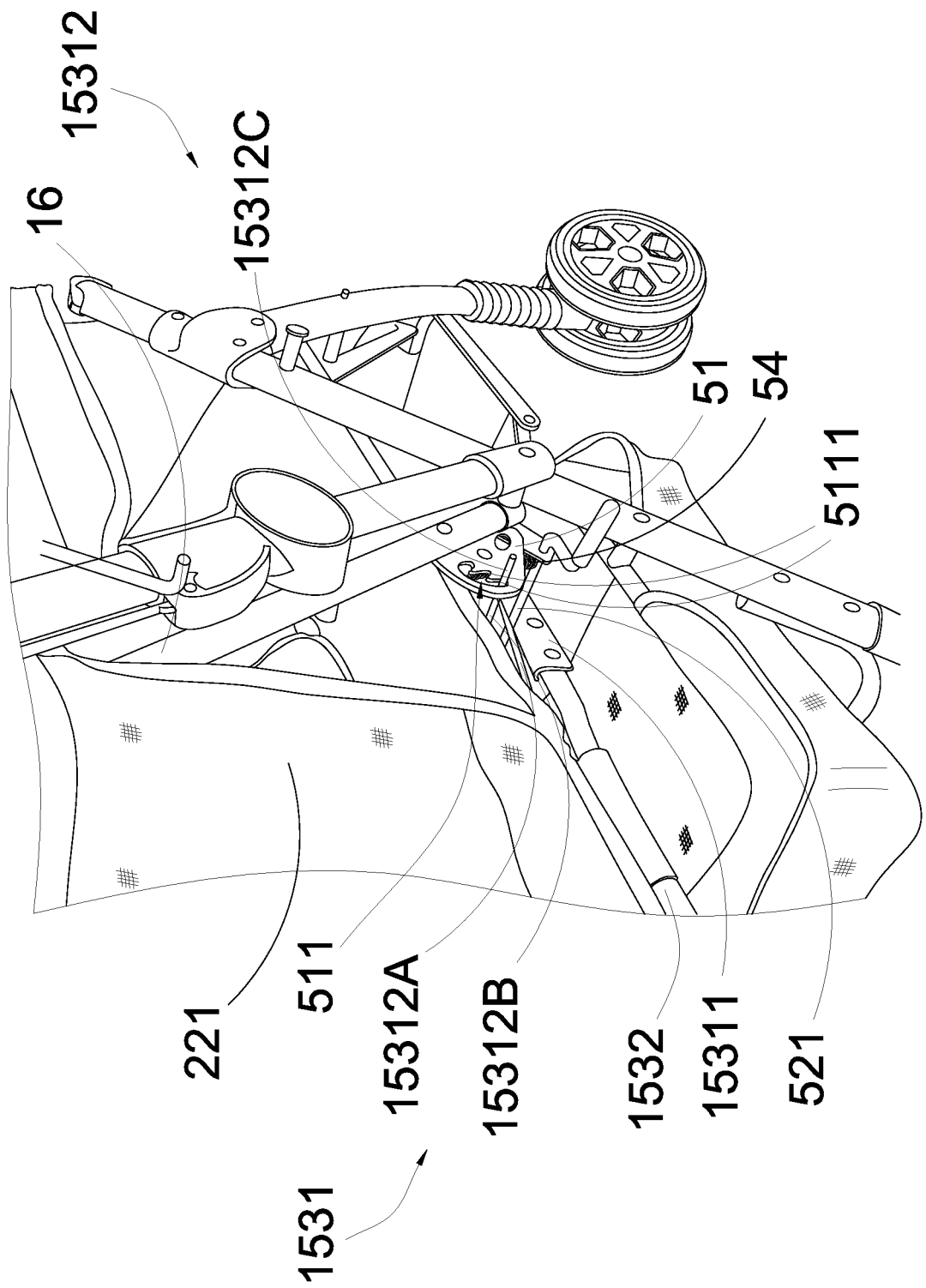
FIG. 6B is a schematic view illustrating the pivotal frame of the pet stroller in unfolded position according to the first preferred embodiment of the present invention.

In addition, referring to FIGS. 5, 6A and 6B, the platform frame 153 further comprises an actuator member 15312 comprising a U-shape actuator bar 15312A and an engaging bar 15312B having two engaging arms 15312C provided at two ends thereof and horizontally and outwardly extended from two ends of the actuator bar 15312A to penetrate through two guiding slots 15311A formed in the base members 15311 respectively so as to couple with the two main bases 51 by extending through the serrated slot 511 and selectively engaging with one of the locking recesses 5111.

The folding and unfolding mechanism 50 further comprises a pair of tension springs 54 coupled between the press bar 521 and the actuator member 15312 as well as the base member 15311. When the actuator bar 15312A of the actuator member 15312 is pulled away from the press bar 521 upwardly, the engaging arms 15312C are disengaged with the locking recesses 5111 and able to move along the serrated slots 511 of the main bases 51 respectively. If each of the engaging arms 15312C is selected to engage with the upper locking recess 5111 of the serrated slot 511 of the respective main base 51, as shown in FIG. 6A, the extension frame 1531 is folded towards the folding frame 16 to fold up a rear platform enclosure 221 of the carriage body 20 which is mounted to the pivotal frame 1532, i.e. the folding position. If each of the engaging arms 15312C is selected to engage with the lower locking recess 5111 of the serrated slot 511 of the respective main base 51, as shown in FIG. 6B, the extension frame 1531 is unfolded to the horizontal unfolding position so as to unfold the rear platform enclosure 221 to enlarge the interior room of the resting cavity 21 of the carriage body 20, as shown in FIGS. 1, 2, 4, and 6B.

In other words, the tension springs 54 function to provide a reinstating force to pull and maintain the engaging arms 15312C being engaged in the selected locking recesses 5111 so as to retain the base member 15311 and the pivotal frame 1532 of the extension frame 1531 in position. To release such reinstating force, the user may simply pull the actuator bar 15312A upwardly away from the press bar 521 as mentioned above.

Since the platform enclosure 22 is supported by platform frame 153 to form the resting cavity 21 therein and the rear platform enclosure 221 is supported by the pivotal frame 1532 in unfolded position, the pivotal frame 1532 can be unfolded and placed into a maximum angular position relative to the folding frame 16 to provide a maximum room of the resting cavity 21 for larger animal. In the other words, when the pivotal frame 1532 is overlapped with the folding frame 16, which means that the pivotal frame 1532 is folded and placed into a minimum angular position relative to the folding frame 16, the resting cavity 21 is reduced to have a smaller room for smaller animal. Therefore, the pet stroller of the present invention is able to provide at least two sizes of resting cavity 21 for allowing the animals to stay therein.

Figure 7:
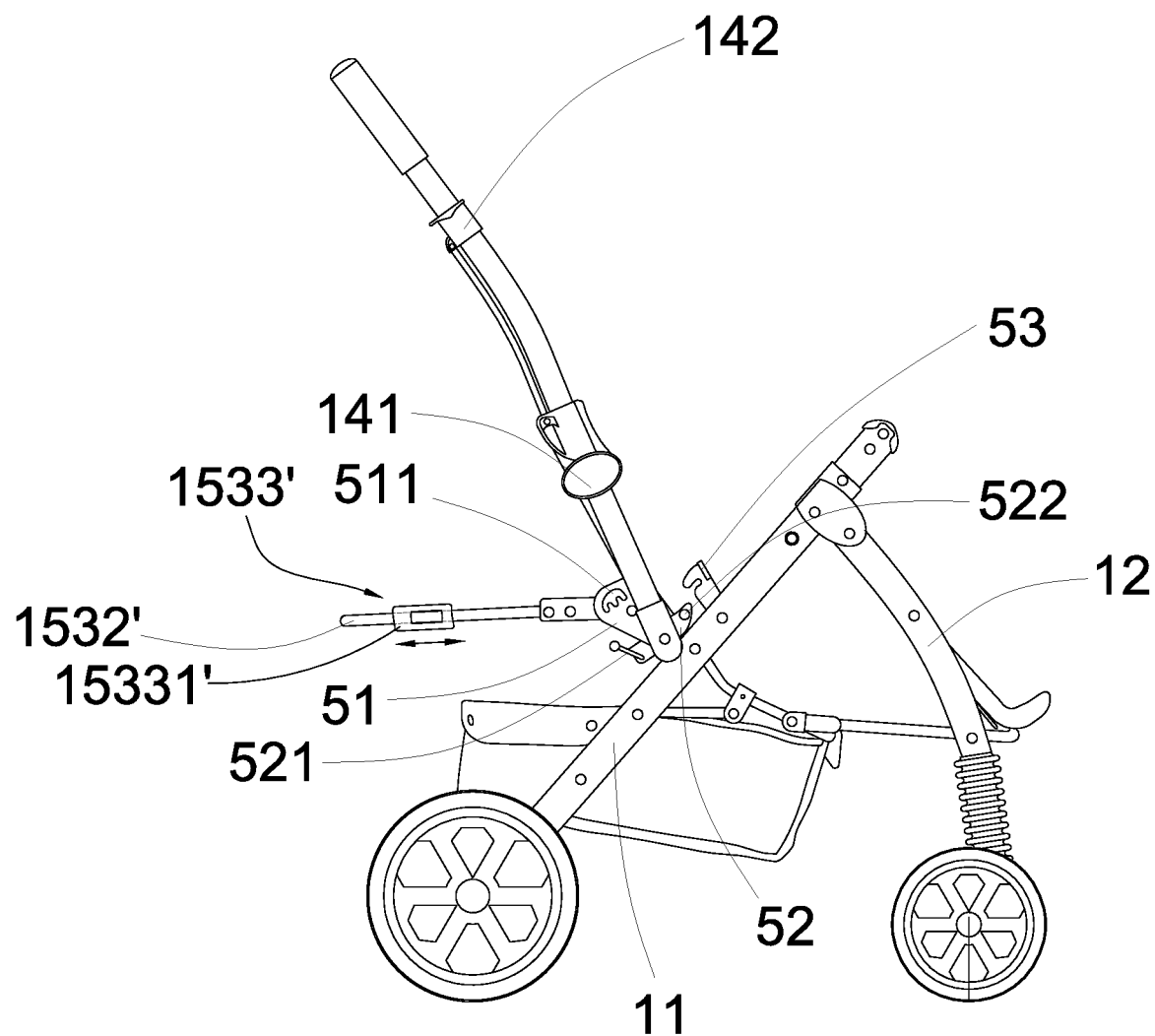
FIG. 7 is side schematic view illustrating the frame body of an alternative mode of the first preferred embodiment of the present invention.

Referring to FIG. 7, an alternative mode of the U-shaped pivotal frame 1532' is illustrated, wherein two extensible devices 1533' is provided at two side bars of the U-shaped pivotal frame 1532'. Each of the extensible devices 1533' can be embodied to comprise holding sleeve 15331' having a threaded through hole to enable the end portion of the pivotal frame 1532' screwed therein, so that by rotating the holding sleeve 15331' clockwise or anticlockwise, the pivotal frame 1532' can be extended outwardly or inwardly to further enlarge or reduce the supporting area of the rear platform enclosure 221 respectively.

It is worth mentioning that the pet stroller may further comprises a ventilation device for maintaining the resting cavity in a comfortable temperature, wherein the ventilation device can be an air condition or an electric fan which can be powered by electric power. In addition, the electric power can be generated by different kinds of power source, such as batteries or solar energy system, wherein the solar energy system can be arranged on the canopy body for exposing under the sun.

Referring to FIG. 8 to FIG. 16 of the drawings, a pet stroller according to a second preferred embodiment of the present invention is illustrated. Broadly, the pet stroller may comprise a canopy fabric 10", a supporting frame assembly 20", a first longitudinal frame 30", a second longitudinal frame 40", a rear wheel frame 50", and a plurality of wheels 60". The pet stroller may be utilized for accommodating at least a pet, such as a dog or a cat.

The canopy fabric 10" may comprise a carriage body 11" and a canopy body 12" connected to the carriage body 11". The carriage body 11" may have a foldable bottom panel 111", an accommodating cavity 112" for accommodating the pet, and a front opening 113" communicating the accommodating cavity 112" with an exterior of the carriage body 11".

The supporting frame assembly 20" may comprise a main supporting frame 21", an adjustable supporting frame 22" pivotally connected and rearwardly extended from the main supporting frame 21" to move between at least a lying position and a first inclined position, and a utility frame 23" extended from the main supporting frame 21" to a position corresponding to the front opening 113" of the carriage body 11" for allowing the pet to have access to the utility frame 23" through the front opening 113". The carriage body 11" of the canopy fabric 10" may be supported on at least the main supporting frame 21" and the adjustable supporting frame 22".

The first longitudinal frame 30" may be pivotally connected to the supporting frame assembly 20" at a first side of the main supporting frame 21". The first longitudinal frame 30" may have a first upper portion 31" and a first lower portion 32".

The second longitudinal frame 40" may be pivotally connected to the supporting frame assembly 20" at a second side of the main supporting frame 21", wherein the first side and the second side may be opposite to each other. The second longitudinal frame 40" may have a second upper portion 41" and a second lower portion 42".

The rear wheel frame 50" may be supported by the supporting frame assembly 20" and may rearwardly extend from the first longitudinal frame 30" and the second longitudinal frame 40".

The plurality of wheels 60" may be rotatably connected to the first lower portion 32" of the first longitudinal frame 30", the second lower portion 42" of the second longitudinal frame 40", and the rear wheel frame 50".

When the adjustable supporting frame 22" is in the lying position, the adjustable supporting frame 22" may be pivotally moved to substantially align with the main supporting frame 21" while the foldable bottom panel 111" of the carriage body 11" may be arranged to lie substantially flat on the main supporting frame 21" and the adjustable supporting frame 22" for maximizing a volume of the accommodating cavity 112" (see FIG. 10 of the drawings). When the adjustable supporting frame 22" is in the first inclined position, the adjustable supporting frame 22" may be pivotally moved to inclinedly and upwardly extended from the main supporting frame 21" so as to fold the foldable bottom panel 111" for reducing a size of the accommodating cavity 112" (see FIG. 12 of the drawings).

According to the second preferred embodiment of the present invention, the pet stroller may be utilized for allowing a pet to temporarily stay in the carriage body 11" while allowing the pet to have convenient access to the utility frame 23" of the supporting frame assembly 20". A user may be able to dispose a feeding container 80" on the utility frame 23" such that when the feeding container 80" is filled with pet food, the pet may be able to consume the pet food without leaving the accommodating cavity 112" of the carriage body 11". The pet stroller may be fully unfolded to stand or move on the ground (such as that shown in FIG. 1 of the drawings). Alternatively, the pet stroller may be folded to a compact size for easy carrying (such as that shown in FIG. 15 of the drawings).

The canopy fabric 10" may be configured from deformable and soft fabric material, wherein the canopy body 12" may be arranged to selectively cover on top of the carriage body 11" so as to selectively enclose the accommodating cavity 112". The canopy body 12" may have a plurality of meshes 121" for allowing ventilation for the accommodating cavity 112". When in the accommodating cavity 112", the pet may also be able to see outside through the meshes 121".

The carriage body 11" may further comprise a front panel 114", two side panels 115", and a rear panel 116", wherein the accommodating cavity 112" may be enclosed by the front panel 114", the two side panels 115" and the rear panel 116". According to the second preferred embodiment, the front panel 114", the side panels 115", and the rear panel 116" may be configured from fabric material while the foldable bottom panel 111" may be configured from or reinforced by relatively rigid material for better supporting the pet. The front opening 113" may be formed on the front panel 114".

The main supporting frame 21" may comprise a first tubular member 211" and a second tubular member 212" extended between the adjustable supporting frame 22" and the utility frame 23", wherein the first longitudinal frame 30" may be pivotally connected to the first tubular member 211"

while the second longitudinal frame 40" may be pivotally connected to the second tubular member 212".

In this second preferred embodiment, the first tubular member 211" may comprise a first tubular frame 2111" and a first coupling member 2112" extended from the first tubular frame 2111" while the second tubular member 212" may comprise a second tubular frame 2121" and a second coupling member 2122" extended from the second tubular frame 2121". The first coupling member 2112" and the second coupling member 2122" may extend from the first tubular frame 2111" and the second tubular frame 2121" to pivotally connect to the adjustable supporting frame 22". Each of the first tubular frame 2111" and the second tubular frame 2121" may have one end movably connected to the utility frame 23". Each of the first tubular frame 2111", the second tubular frame 2121", the first coupling member 2112" and the second coupling member 2122" may be configured as having an elongated structure. Each of the first tubular frame 2111" and the second tubular frame 2121" may have a cavity for coupling with the corresponding coupling member and the utility frame 22".

The supporting frame assembly 20" may further comprise a securing frame 24" supported above the main supporting frame 21" for supporting the carriage body 11" and the canopy body 12". Specifically, the securing frame 24" may comprise a first securing member 241" pivotally connected to and frontwardly extended from the first longitudinal frame 30", a second securing member 242" pivotally connected to and frontwardly extended from the second longitudinal frame 40", and a third securing member 243" extended between the first securing member 241" and the second securing member 242" to form a U-shaped cross section of the securing frame 24" when viewed from the top.

The securing frame 24" may be supported at a position above the main supporting frame 21" so as to form a receiving cavity 25" as a space between the securing frame 24" and the main supporting frame 21", wherein a large portion of the carriage body 11" may be supported in the receiving cavity 25".

The supporting frame assembly 20" may further comprise a plurality of canopy frames 26" pivotally mounted to the securing frame 24", wherein the canopy body 12" may be attached on the canopy frames 26" so that the canopy frames 26" may pivotally and selectively move the canopy body 12" to open or enclose the accommodating cavity 112". Specifically, each of the canopy frames 26" may have a U-shaped structure in which two ends of each of the canopy frames 26" may be pivotally connected to the first securing member 241" and the second securing member 242" of the securing frame 24" respectively.

The canopy body 12" may be attached on the canopy frames 26" in such a manner that when the canopy frames 26" pivotally moves with respect to the securing frame 24", the canopy body 12" may be driven to move to open or enclose the accommodating cavity 112". Moreover, one of the canopy frames 26" may be attached on the first securing member 241" and the second securing member 242" in such a manner that the corresponding canopy frame 26" may be pivotally moved toward the third securing member 243" and arranged to selectively interlock with the third securing member 243" so as to prevent the canopy body 12" from accidentally opening.

On the other hand, the carriage body 11" of the canopy body 10" may be suspendedly attached on the securing frame 24" for maintaining the accommodating cavity 112". Thus, the a top portion 1141" of the front panel 114" may be secured to the third securing member 243" while top portions 1151" of each of the side panels 115" may be secured to the first securing member 241" and the second securing member 242" respectively. These attachments may be accomplished by buttons 118" or other conventional methods.

The supporting frame assembly 20" may further comprise a first reinforcing frame 271" having one end pivotally connected to the first securing member 241", and another end pivotally connected to the first longitudinal frame 30". The supporting frame assembly 20" may further comprise a second reinforcing frame 272" having one end pivotally connected to the second securing member 242", and another end pivotally connected to the second longitudinal frame 40". The first reinforcing frame 271" and the second reinforcing frame 272" may be utilized to support and reinforce the securing frame 24" while still allowing folding operation of the pet stroller. Each of the first reinforcing frame 271" and the second reinforcing frame 272" may be configured as an elongated bar.

The rear wheel frame 50" may comprise a first leg member 51" and a second leg member 52" pivotally connected to the first longitudinal frame 30" and the second longitudinal frame 40" respectively. The first leg member 51" and the second leg member 52" may rearwardly extend from the first longitudinal frame 30" and the second longitudinal frame 40" respectively. Two of the wheels 60" may be rotatably attached on the first leg member 51" and the second leg member 52" respectively, while another two of the wheels 60" may be rotatably attached on the first lower portion 32" and the second lower portion 42" of the first longitudinal frame 30" and the second longitudinal frame 40" respectively. A rear shaft 53" may extend between the first leg member 51" and the second leg member 52" for reinforcing a supporting strength of the rear wheel frame 50". Each of the first leg member 51" and the second leg member 52" may have an elongated and curved structure. A front shaft 54" may extend between the first longitudinal frame 30" and the second longitudinal frame 40" near the two corresponding wheels 60" for further reinforcing a supporting strength of the first longitudinal frame 30" and the second longitudinal frame 40". Each of the front shaft 54" and the rear shaft 53" may extend along a transverse direction (i.e. width) of the pet stroller.

The pet stroller may further comprise a storage basket 70" supported underneath the main supporting frame 21" for allowing a user to store additional accessories therein. The storage basket 70" may be configured from fabric or soft material so that it may collapse into compact size when the pet stroller is folded. The storage basket 70" may be attached on the rear wheel frame 50" via an attachment bar 55" extended between the first leg member 51" and the second leg member 52" along a transverse direction of the pet stroller. The storage basket 70" may also be attached on the front shaft 54".

The supporting frame assembly 20" may further comprise a first folding frame 291" and a second folding frame 292". The first folding frame 291" may be arranged to connect the first longitudinal frame 30" to the first leg member 51" and the first tubular member 211" (preferably the first tubular frame 2111") of the main supporting frame 21". The second folding frame 292" may be arranged to connect the second longitudinal frame 40" to the second leg member 52" and the second tubular member 212" (preferably the second tubular frame 2112") of the main supporting frame 21".

The first folding frame 291" may comprise a first folding frame member 2911" having one end pivotally connected to the first longitudinal frame 30", a second folding frame member 2912" having one end pivotally connected to the first longitudinal frame 30" at a position below the first folding frame member 2911", and a third folding frame member 2913" having one end pivotally connected to the first tubular frame 2111" and another end pivotally connected to the second folding frame member 2912".

The second folding frame 292" may comprise a fourth folding frame member 2921" having one end pivotally connected to the second longitudinal frame 40", a fifth folding frame member 2922" having one end pivotally connected to the second longitudinal frame 40" at a position below the fourth folding frame member 2921", and a sixth folding frame member 2923" having one end pivotally connected to the second tubular frame 2121" and another end pivotally connected to the fifth folding frame member 2922".

Figure 9:
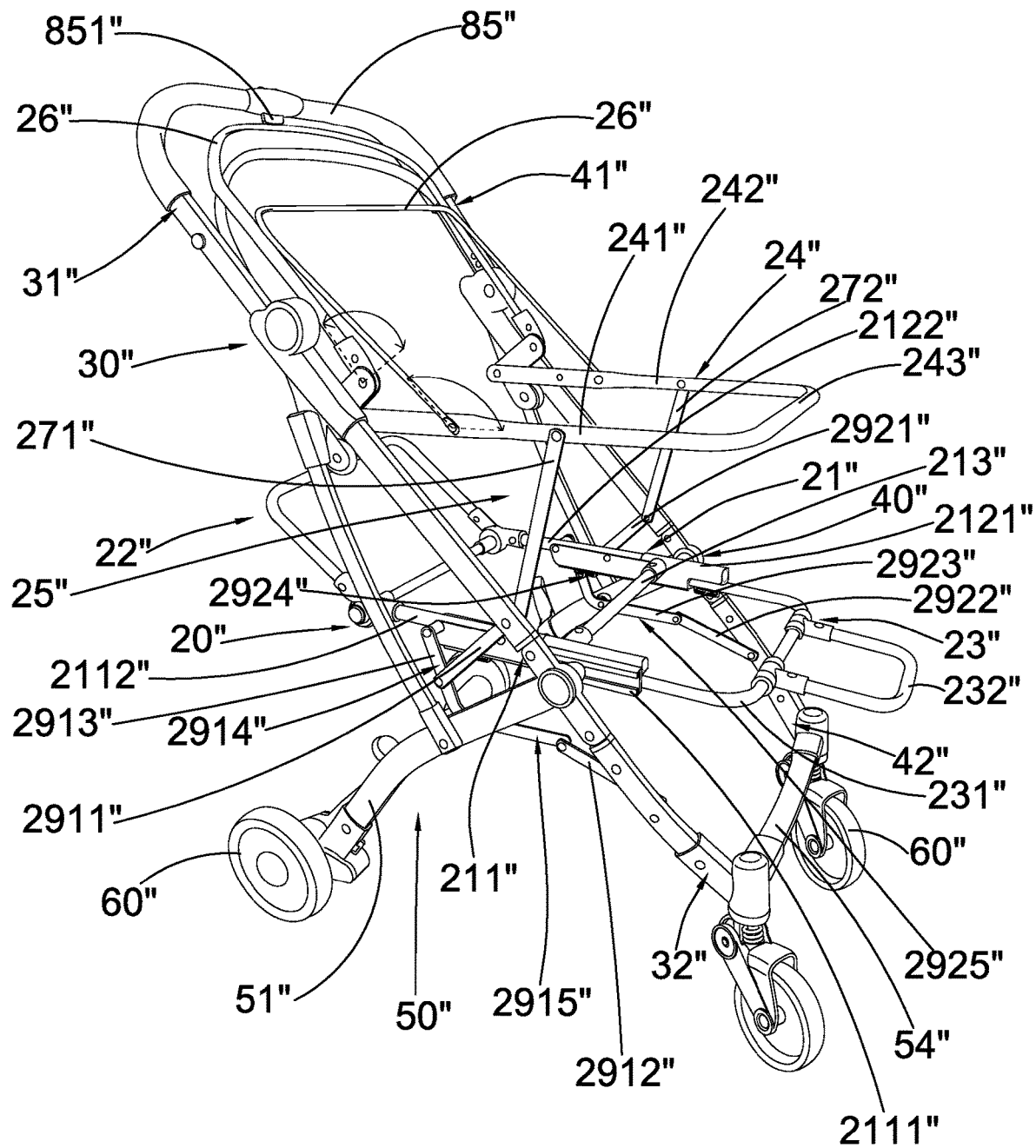
FIG. 9 is a perspective view of a pet stroller according to the second preferred embodiment of the present invention, illustrating a supporting frame assembly of the pet stroller.
Figure 16:
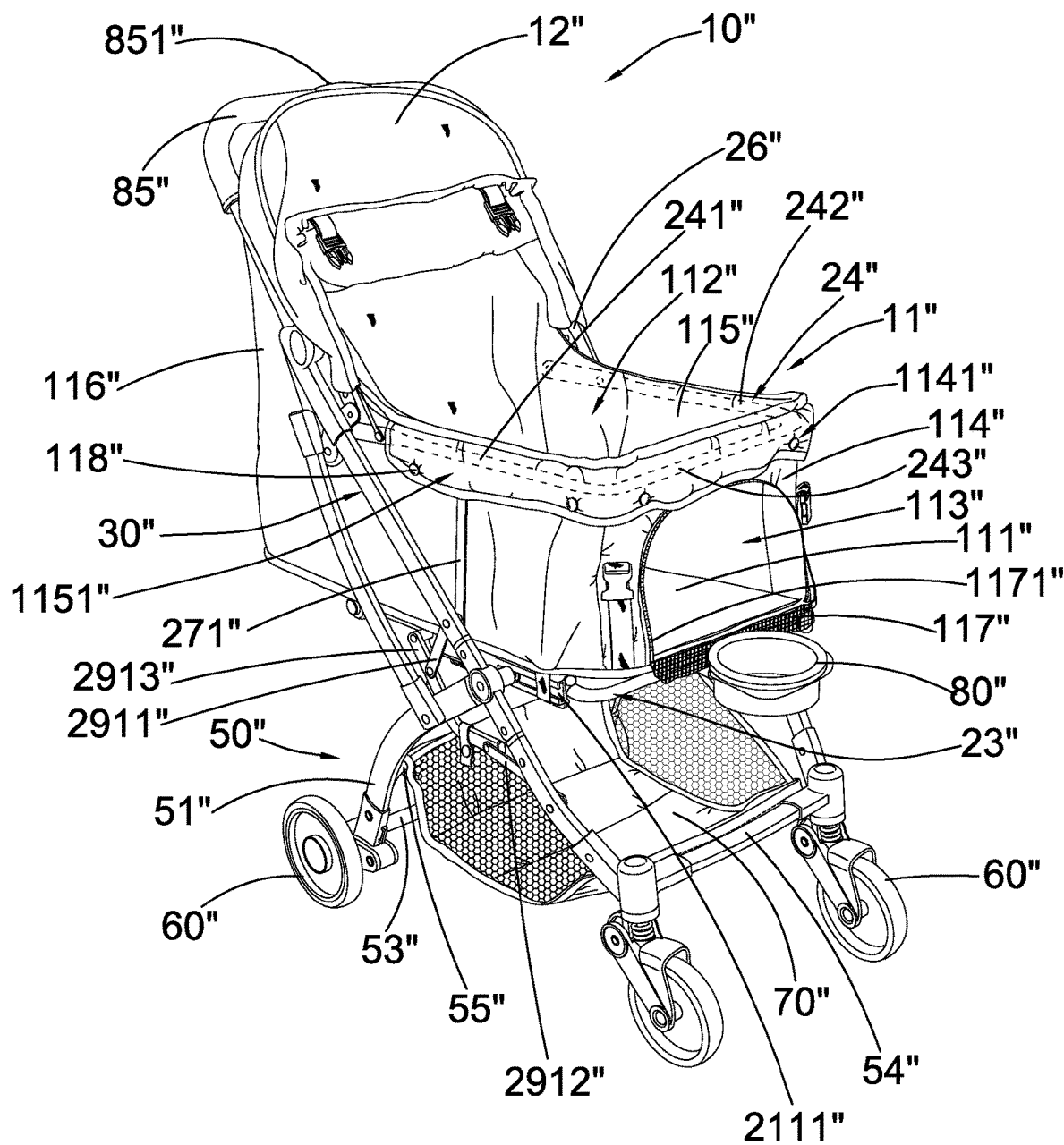
FIG. 16 is a perspective view of a pet stroller according to the second preferred embodiment of the present invention, illustrating that pet food may be served on an utility frame.

As shown in FIG. 9 and FIG. 16 of the drawings, each of the first folding frame member 2911" and the second folding frame member 2912" may be elongated in shape, while the third folding frame member 2913" may have a first upright portion 2914" and a first extension portion 2915" extended from the first upright portion 2914" to form a substantially L-shaped contour. The first tubular frame 2111" may be pivotally connected to the first upright portion 2914" of the third folding frame member 2913", while the second folding frame member 2912" may be pivotally connected to the first extension portion 2915" of the third folding frame member 2913".

Similarly, each of the fourth folding frame member 2921" and the fifth folding frame member 2922" may be elongated in shape, while the sixth folding frame member 2923" may have a second upright portion 2924" and a second extension portion 2925" extended from the second upright portion 2924" to form a substantially L-shaped contour. The second tubular frame 2121" may be pivotally connected to the second upright portion 2924" of the third folding frame member 2913", while the fifth folding frame member 2922" may be pivotally connected to the second extension portion 2925" of the sixth folding frame member 2923".

Figure 13:
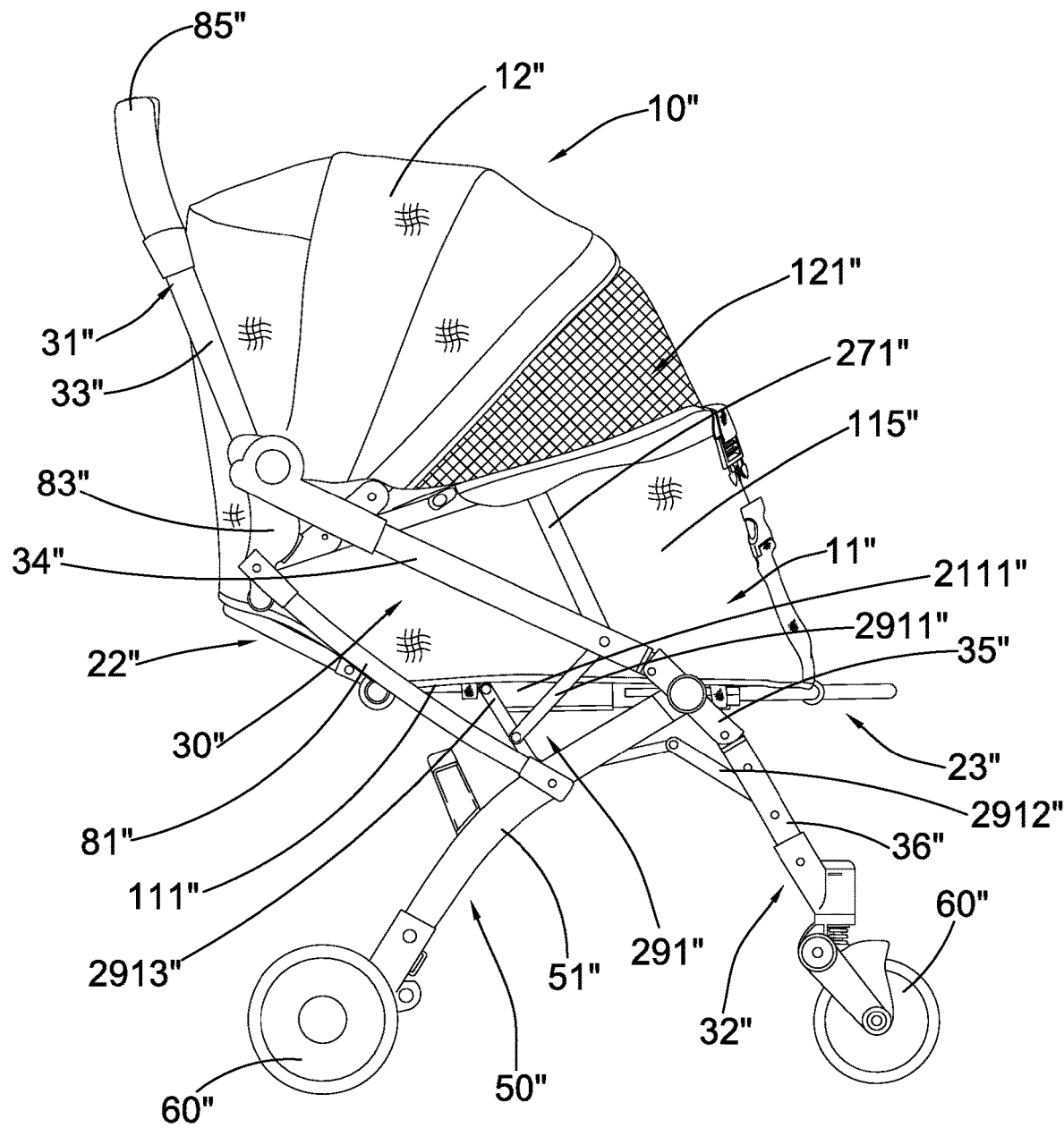
FIG. 13 is a side view of the pet stroller according to the second preferred embodiment of the present invention, illustrating a supporting frame assembly of the pet stroller.
Figure 14:
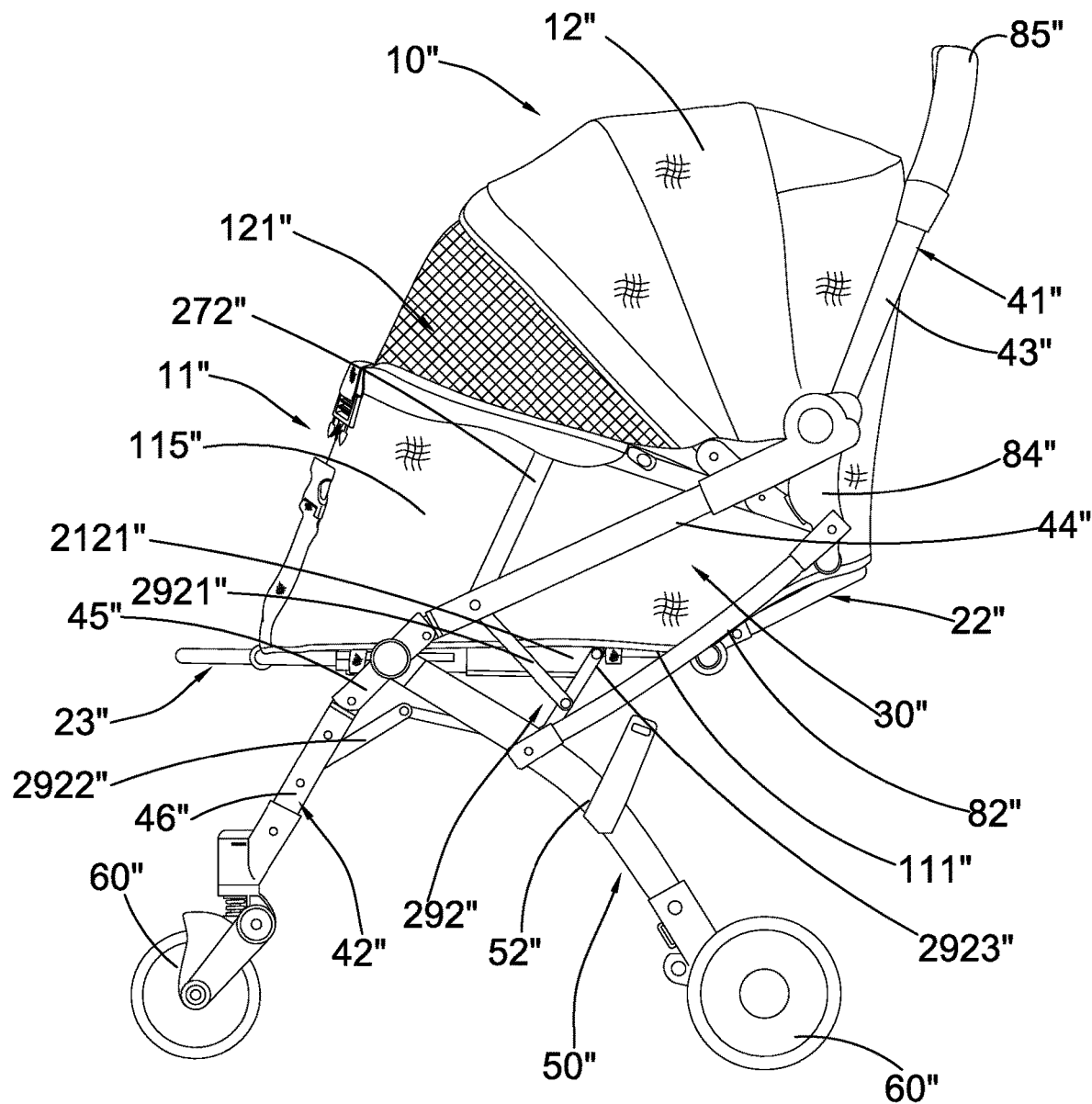
FIG. 14 is another side view of the pet stroller according to the second preferred embodiment of the present invention, illustrating a supporting frame assembly of the pet stroller.

Referring to FIG. 13 and FIG. 14 of the drawings, the first longitudinal frame 30" may comprise a first through fourth longitudinal frame member 33", 34", 35", 36" sequentially arranged in a top-down manner, in which each of the first through fourth longitudinal frame member 33", 34", 35", 36" may be pivotally connected to an adjacent longitudinal frame member. Thus, the first longitudinal frame member 33" may be pivotally connected to the second longitudinal frame member 34", which may also be pivotally connected to the third longitudinal frame member 35". The third longitudinal frame member 35" may also be pivotally connected to the fourth longitudinal frame member 36". When unfolded, the first through fourth longitudinal frame member 33", 34", 35", 36" may form a straight or aligned structure while the first longitudinal frame 30" may be inclinedly supported with respect to the ground, wherein the first upper portion 31" may be formed on the first longitudinal frame member 33", while the first lower portion 32" may be formed on the fourth longitudinal frame member 36".

This arrangement is identical to the second longitudinal frame 40". Thus, the second longitudinal frame 40" may comprise a fifth through eighth longitudinal frame member 43", 44", 45", 46" sequentially arranged in a top-down manner, in which each of the fifth through eighth longitudinal frame member 43", 44", 45", 46" may be pivotally connected to an adjacent longitudinal frame member. Thus, the fifth longitudinal frame member 43" may be pivotally connected to the sixth longitudinal frame member 44", which may also be pivotally connected to the seventh longitudinal frame member 45". The seventh longitudinal frame member 45" may also be pivotally connected to the eighth longitudinal frame member 46". When unfolded, the fifth through eighth longitudinal frame member 43", 44", 45", 46" may form a straight or aligned structure while the second longitudinal frame 40" may be inclinedly supported with respect to the ground and parallel with the first longitudinal frame 30", wherein the second upper portion 41" may be formed on the fifth longitudinal frame member 43", while the second lower portion 42" may be formed on the eighth longitudinal frame member 46".

As shown in FIG. 13 and FIG. 14 of the drawings, the first folding frame member 2911" may be pivotally connected to the second longitudinal frame member 34", while the second folding frame member 2912" may be pivotally connected to the fourth longitudinal frame member 36". Similarly, the fourth folding frame member 2921" may be pivotally connected to the sixth longitudinal frame member 44", while the fifth folding frame member 2922" may be pivotally connected to the eighth longitudinal frame member 46". Moreover, the first leg member 51" of the rear wheel frame 50" may rearwardly extend from the third longitudinal frame member 35" while the second leg member 52" may rearwardly extend from the seventh longitudinal frame member 45".

The pet stroller may further comprise a first connecting frame 81" and a second connecting frame 82". The first connecting frame 81" may have one end pivotally connected to the first leg member 51" of the rear wheel frame 50", and another end pivotally connected to a first protruding flap 83" extended from the second longitudinal frame member 34" of the first longitudinal frame 30".

The second connecting frame 82" may have one end pivotally connected to the second leg member 52" of the rear wheel frame 50", and another end pivotally connected to a second protruding flap 84" extended from the sixth longitudinal frame member 44" of the second longitudinal frame 40".

The first folding frame 291" and the second folding frame 292" may be utilized for facilitating folding and unfolding of the pet stroller. When folding, the first folding frame member 2911" may pivotally move with respect to the second folding frame member 2912" while the third folding frame member 2913" may pivotally move with respect to second folding frame member 2912". On the other hand, the fourth folding frame member 2921" may pivotally move with respect to the fifth folding frame member 2922" while the sixth folding frame member 2923" may pivotally move with respect to fifth folding frame member 2922".

Figure 15:
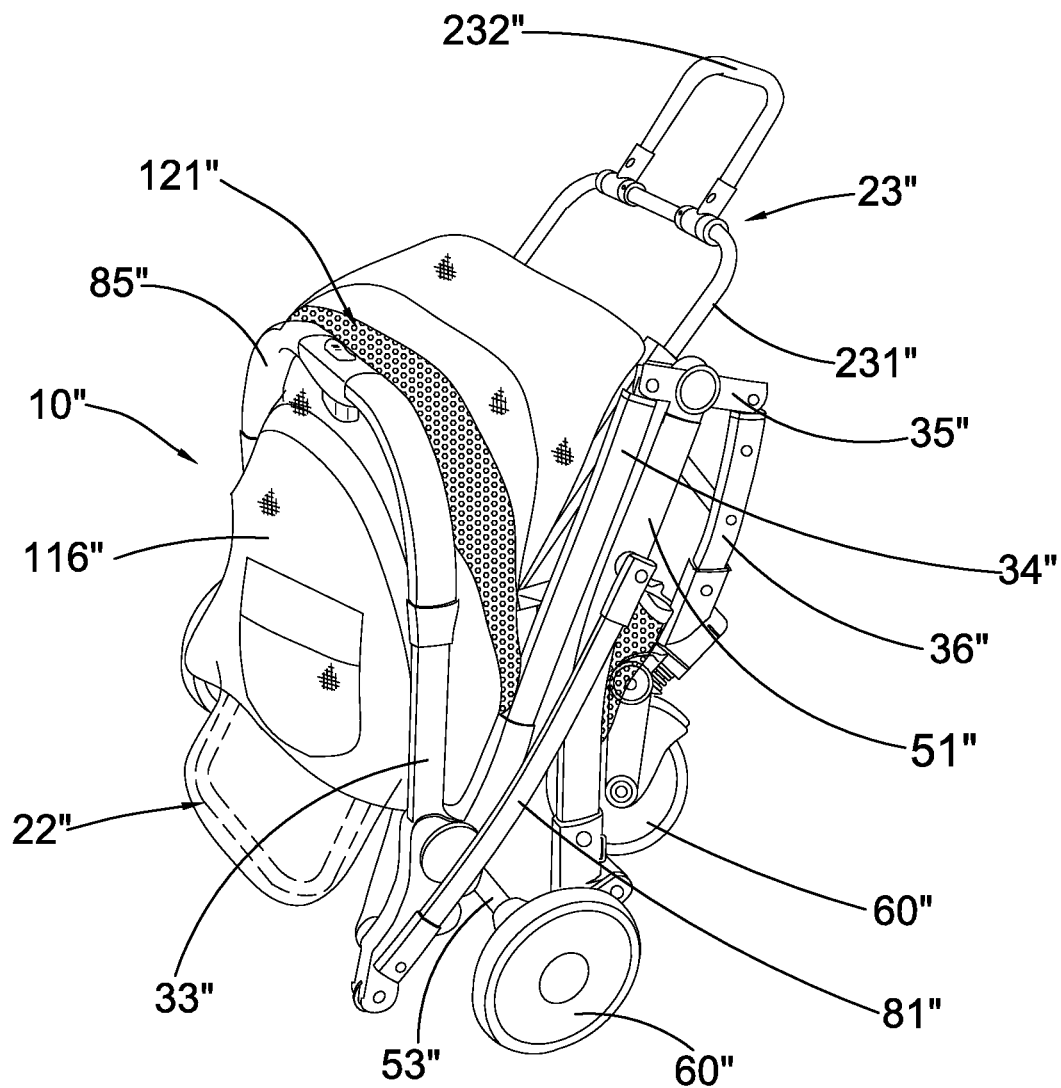
FIG. 15 is a perspective view of a pet stroller according to the second preferred embodiment of the present invention, illustrating that the pet stroller is fully folded.

Moreover, the fourth longitudinal frame member 36" and the second longitudinal frame member 34" may be pivotally move with respect to the third longitudinal frame member 35", while the eighth longitudinal frame member 46" and the sixth longitudinal frame member 44" may be pivotally move with respect to the seventh longitudinal frame member 45" for collapsing the supporting frame assembly 20", the first longitudinal frame 30" and the second longitudinal frame 40" in a compact structure. FIG. 15 illustrates a fully folded status of the pet stroller of the present invention.

The pet stroller may further comprise a handle bar 85" extended between the first longitudinal frame 30" and the second longitudinal frame 40" for allowing a user to grab thereon. More specifically, the handle bar 85" may extend between the first upper portion 31" and the second upper portion 41".

As shown in FIG. 10 to FIG. 12 of the drawings, the adjustable supporting frame 22" of the supporting frame assembly 20" may have a first adjustable frame member 221" and a second adjustable frame member 222" pivotally connected to and rearwardly extend from the first coupling member 2112" and the second coupling member 2122" respectively. The first adjustable frame member 221" and the second adjustable frame member 22" may extend along a longitudinal direction of the first coupling member 2112" and the second coupling member 2122" respectively when the adjustable supporting frame 22" is in the lying position.

In addition, the adjustable supporting frame 22" may further have a third adjustable frame member 223" extended between the first adjustable frame member 221" and the second adjustable frame member 222" along transverse direction thereof for forming a U-shaped structure of the adjustable supporting frame 22" when viewed from the top, as illustrated in FIG. 10 of the drawings.

The main supporting frame 21" may further comprise a joining member 213" extended between the first tubular frame 2111" and the second tubular frame 2121" for reinforcing a supporting structure of the main supporting frame 21".

The foldable bottom panel 111" of the carriage body 11" may be securely supported on the adjustable supporting frame 22" which may be selectively moved between the lying position and the first inclined position. According to the second preferred embodiment of the present invention, the adjustable supporting frame 22" may be connected to the main supporting frame 21" to further move in a second inclined position.

When the adjustable supporting frame 22" is in the second inclined position, the adjustable supporting frame 22" may be pivotally and upwardly extended from said main supporting frame 21" at a second predetermined angle of inclination.

Figure 8:
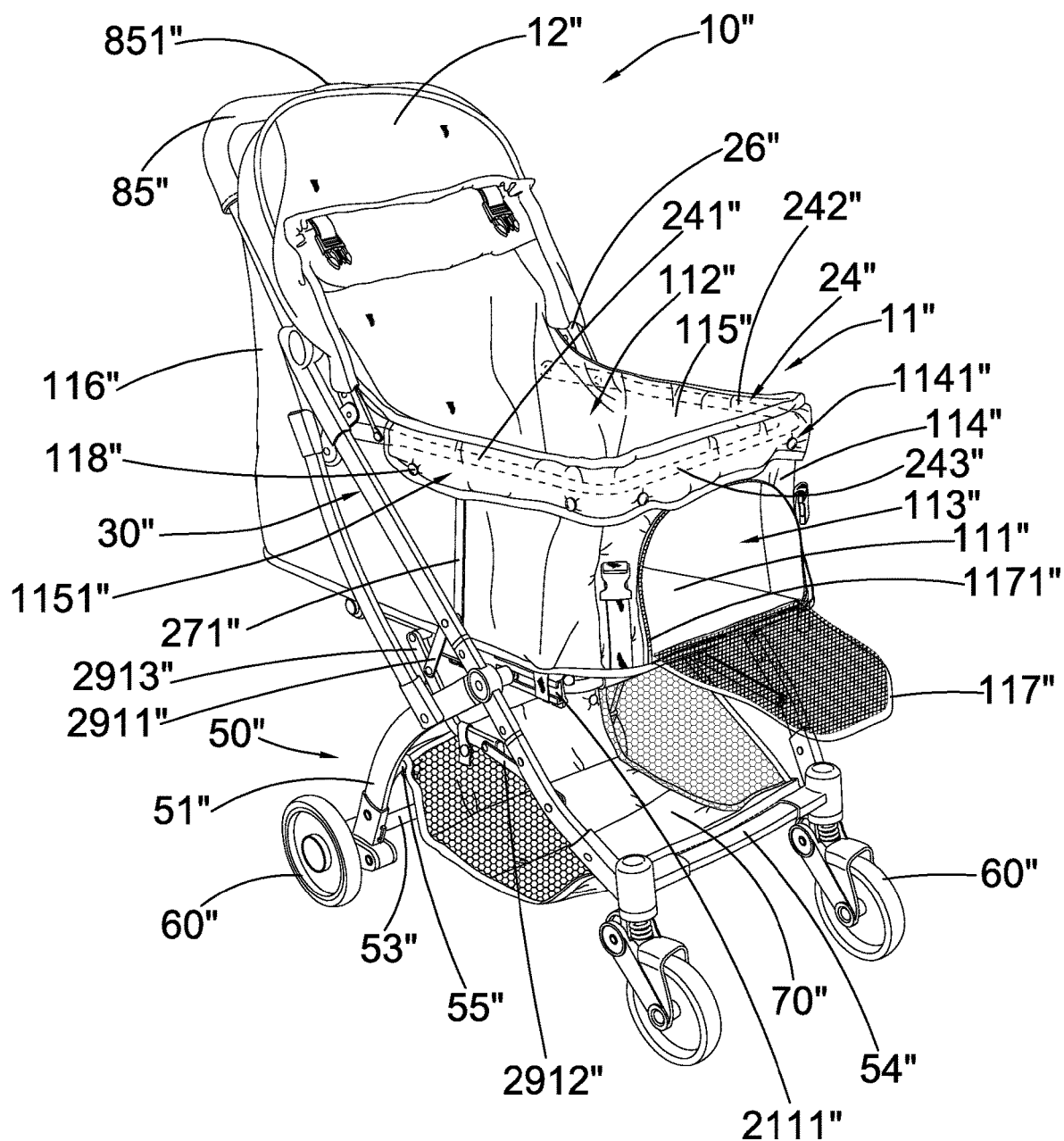
FIG. 8 is a perspective view of a pet stroller according to a second preferred embodiment of the present invention, illustrating that the pet stroller is fully unfolded.

Thus, when the adjustable supporting frame 22" is in the lying position, the adjustable supporting frame 22" and the main supporting frame 21" may be substantially aligned so that foldable bottom panel 111" may be laid flat on the adjustable supporting frame 22" and the main supporting frame 21" (see FIG. 8 and FIG. 10). When the adjustable supporting frame 22" is in the first inclined position, the adjustable supporting frame 22" may be pivotally moved up and maintained at a first predetermined angle of inclination with respect to the first tubular member 211" and the second tubular member 212". The foldable bottom panel 111" may be correspondingly folded so that the size of the accommodating cavity 112" may be correspondingly reduced (see FIG. 12).

When the adjustable supporting frame 22" is in the second inclined position, the adjustable supporting frame 22" may be pivotally moved up and maintained at a second predetermined angle of inclination with respect to the first tubular member 211" and the second tubular member 212". The foldable bottom panel 111" may be correspondingly folded so that the size of the accommodating cavity 112" may be correspondingly reduced (see FIG. 11). In this second preferred embodiment of the present invention, the first predetermined angle of inclination is larger than the second predetermined angle of inclination.

The position of the adjustable supporting frame 22" may be maintained by a lock provided between the adjustable supporting frame 22" and the main supporting frame 21". The lock may be released by pressing a lock button 200" so as to move the adjustable supporting frame 22" between the lying position, the first inclined position, and the second inclined position.

The utility frame 23" may further comprise a slidable frame 231" and a pivotal frame 232" pivotally connected to the pivotal frame 232". The slidable frame 231" may be slidably connected to the first tubular frame 2111" and the second tubular frame 2121" so that the slidable frame 231" may slide out from the main supporting frame 21". The pivotal frame 232" may be pivotally connected to the slidable frame 231" for being pivotally moved and maintained at a position corresponding to the front opening 113", such as that shown in FIG. 16 of the drawings. The slidable frame 231" may be slid toward the first tubular frame 2111" and the second tubular frame 2121" so as to hide the pivotal frame 232" underneath the carriage body 11", as shown in FIG. 8 of the drawings. However, a user may be able to slide the slidable frame 231" away from the first tubular frame 2111" and the second tubular frame 2121" and pivotally move and maintain the pivotal frame 232" to a position corresponding to the front opening 113". At this time, a user is able to put a pet feeding bowl on the pivotal frame 232" for temporarily storing pet food. The pet accommodated in the accommodating cavity 112" may be able to access the pet food through the front opening 113". Each of the slidable frame 231" and the pivotal frame 232" may have a U-shaped structure.

When the pet stroller is fully folded, the slidable frame 231" may be slid out from the main supporting frame 21" while the pivotal frame 232" may be utilized as a handle for carrying or pulling the pet stroller through the wheels 60", as shown in FIG. 15 of the drawings.

The carriage body 11" may further comprise a flap 117" movably provided on the front panel 114" for selectively opening and closing the front opening 113". The flap 117" may be selectively attached to the front panel 114" through a zipper 1171".

The operation of the present invention may be as follows: the pet stroller may be arranged to accommodate a pet in the accommodating cavity 112". A size of the accommodating cavity 112" may be adjustable by adjusting the position of the adjustable supporting frame 22" in the manner as described above. The canopy frames 26" may be selectively and pivotally move to drive the canopy body 12" to open or close the accommodating cavity 112". When the accommodating cavity 112" is fully closed, one of the canopy frames 26" may be arranged to interlock with the third securing member 243".

Moreover, a user may be able to manually open the flap 117", pull out the pivotally frame 232", and put a pet food container thereon. After that, the pet in the accommodating cavity 112" may gain access to the pet food through the front opening 113". After the pet food has been consumed, the pet may fully go back to the accommodating cavity 112" and the flap 117" may be zipped to the front panel 114". A user of the pet stroller may move the pet to a desirable place by pushing the handle bar 85".

When the user finishes using the pet stroller, a user may press an actuation button 851" provided on the handle bar 85" for actuating folding of the pet stroller. From the forgoing descriptions, it can be appreciated that the pet stroller described above may be selectively unfolded to carry a pet in the accommodating cavity 112". The pet may have access to the pet food when the pivotal frame 232" is moved to near the front opening 113".

When the pet stroller is not in use, the user may selectively unfold it and use the pivotal frame 23" as a handle for carrying the pet stroller in a convenience manner.

The present invention, while illustrated and described in terms of a preferred embodiment and several alternatives, is not limited to the particular description contained in this specification. Additional alternative or equivalent components could also be used to practice the present invention.

What is claimed is:

1. A pet stroller for accommodating at least a pet, comprising:
   a canopy fabric comprising a carriage body and a canopy body connected to said carriage body, said carriage body having a foldable bottom panel, an accommodating cavity for accommodating said pet, and a front opening communicating said accommodating cavity with an exterior of said carriage body;
   a supporting frame assembly which comprises a main supporting frame, an adjustable supporting frame pivotally connected and rearwardly extended from said main supporting frame to move between at least a lying position and a first inclined position, and a utility frame extended from said main supporting frame to a position corresponding to said front opening of said carriage body for allowing said pet to have access to siad utility frame through said front opening, said carriage body of said canopy fabric being supported on said main supporting frame and said adjustable supporting frame;
   a first longitudinal frame pivotally connected to said supporting frame assembly at a first side of said main supporting frame, said first longitudinal frame having a first upper portion and a first lower portion;
   a second longitudinal frame pivotally connected to said supporting frame assembly at a second side of said main supporting frame, said first side and said second side being opposite to each other, said second longitudinal frame having a second upper portion and a second lower portion;
   a rear wheel frame supported by said supporting frame assembly and rearwardly extended from said first longitudinal frame and said second longitudinal frame;
   a plurality of wheels rotatably connected to said first lower portion of said first longitudinal frame, said second lower portion of said second longitudinal frame, and said rear wheel frame;
   wherein when said adjustable supporting frame is in said lying position, said adjustable supporting frame is pivotally moved to substantially align with said main supporting frame while said foldable bottom panel of said carriage body is arranged to lie substantially flat on said main supporting frame and said adjustable supporting frame for maximizing a volume of said accommodating cavity, wherein when said adjustable supporting frame is in said first inclined position, said adjustable supporting frame is pivotally moved to inclinedly and upwardly extended from said main supporting frame for reducing a size of said accommodating cavity.

2. The pet stroller, as recited in claim 1, wherein said main supporting frame comprises a first tubular member and a second tubular member extended between said adjustable supporting frame and said utility frame, said first longitudinal frame pivotally connecting to said first tubular member, said second longitudinal frame pivotally connecting to said second tubular member.

3. The pet stroller, as recited in claim 2, wherein said first tubular member comprises a first tubular frame and a first coupling member rearwardly extended from said first tubular frame, said first coupling member pivotally connecting to said adjustable supporting frame.

4. The pet stroller, as recited in claim 3, wherein said second tubular member comprises a second tubular frame and a second coupling member rearwardly extended from said second tubular frame, said second coupling member pivotally connecting to said adjustable supporting frame.

5. The pet stroller, as recited in claim 2, wherein said supporting frame assembly further comprises a securing frame supported above said main supporting frame for supporting said carriage body and said canopy body, said securing frame comprising a first securing member pivotally connected to and frontwardly extended from said first longitudinal frame, a second securing member pivotally connected to and frontwardly extended from said second longitudinal frame, and a third securing member extended between said first securing member and said second securing member.

6. The pet stroller, as recited in claim 5, wherein said supporting frame assembly further comprises at least one canopy frame pivotally mounted to said securing frame, wherein said canopy body is attached on said canopy frame in such a manner that when said canopy frame pivotally moves to enclose said accommodating cavity, said canopy frame is arranged to selectively interlock with said third securing member so as to prevent said canopy body from being accidentally opened.

7. The pet stroller, as recited in claim 2, wherein said rear wheel frame comprises a first leg member and a second leg member pivotally connected to and rearwardly extended from said first longitudinal frame and said second longitudinal frame respectively.

8. The pet stroller, as recited in claim 4, wherein said supporting frame assembly further comprises a first folding frame which comprises a first folding frame member having one end pivotally connected to said first longitudinal frame, a second folding frame member having one end pivotally connected to said first longitudinal frame at position below said first folding frame, and a third folding frame member having one end pivotally connected to said first tubular frame and another end pivotally connected to said second folding frame member.

9. The pet stroller, as recited in claim 8, wherein said supporting frame assembly further comprises a second folding frame which comprises a fourth folding frame member having one end pivotally connected to said second longitudinal frame, a fifth folding frame member having one end pivotally connected to said second longitudinal frame at a position below said fourth folding frame member, and a sixth folding frame member having one end pivotally connected to said second tubular frame and another end pivotally connected to said fifth folding frame member.

10. The pet stroller, as recited in claim 9, wherein said third second folding frame member has a first upright portion and a first extension portion extended from said first upright portion to form a substantially L-shaped contour, said first tubular frame pivotally connecting to said first upright portion, while said second folding frame member pivotally connecting to said first extension portion of said third folding frame member.

11. The pet stroller, as recited in claim 10, wherein said sixth folding frame member has a second upright portion and a second extension portion extended from said second upright portion to form a substantially L-shaped contour, said second tubular frame pivotally connecting to said second upright portion of said third folding frame member, while said fifth folding frame member pivotally connecting to said second extension portion of said sixth folding frame member.

12. The pet stroller, as recited in claim 11, wherein said first longitudinal frame comprises a first through fourth longitudinal frame member sequentially arranged in a top-down manner, in which said first longitudinal frame member is pivotally connected to said second longitudinal frame member, which is pivotally connected to said third longitudinal frame member, said third longitudinal frame member pivotally connecting to said fourth longitudinal frame member, said first upper portion being formed on said first longitudinal frame member, while said first lower portion being formed on said fourth longitudinal frame member.

13. The pet stroller, as recited in claim 12, wherein said second longitudinal frame comprises a fifth through eighth longitudinal frame member sequentially arranged in a top-down manner, in which said fifth longitudinal frame member is pivotally connected to said sixth longitudinal frame member, which is pivotally connected to said seventh longitudinal frame member, said seventh longitudinal frame member pivotally connecting to said eighth longitudinal frame member, said second upper portion being formed on said fifth longitudinal frame member, while said second lower portion being formed on said eighth longitudinal frame member.

14. The pet stroller, as recited in claim 13, wherein said first folding frame member is pivotally connected to said second longitudinal frame member, while said second folding frame member is pivotally connected to said fourth longitudinal frame member, said fourth folding frame member pivotally connecting to said sixth longitudinal frame member, while said fifth folding frame member pivotally connecting to said eighth longitudinal frame member, said first leg member rearwardly extending from said third longitudinal frame member while said second leg member rearwardly extending from said seventh longitudinal frame member.

15. The pet stroller, as recited in claim 4, wherein said adjustable supporting frame of said supporting frame assembly has a first adjustable frame member and a second adjustable frame member pivotally connected to and rearwardly extend from said first coupling member and said second coupling member respectively, said first adjustable frame member and said second adjustable frame member extending along a longitudinal direction of said first coupling member and said second coupling member respectively when said adjustable supporting frame is in said lying position, said adjustable supporting frame further having a third adjustable frame member extended between said first adjustable frame member and said second adjustable frame member along transverse direction thereof for forming a U-shaped structure of said adjustable supporting frame.

16. The pet stroller, as recited in claim 2, wherein when said adjustable supporting frame is in said lying position, said adjustable supporting frame and said main supporting frame are substantially aligned so that said foldable bottom panel is laid flat on said adjustable supporting frame and said main supporting frame, wherein when said adjustable supporting frame is in said first inclined position, said adjustable supporting frame is pivotally moved up and maintained at a first predetermined angle of inclination with respect to said first tubular member and said second tubular member, said adjustable supporting frame being connected to said main supporting frame to further move in a second inclined position, wherein in said second inclined position, said adjustable supporting frame is pivotally and upwardly extended from said main supporting frame at a second predetermined angle of inclination, wherein said first predetermined angle of inclination is larger than said second predetermined angle of inclination.

17. The pet stroller, as recited in claim 15, wherein when said adjustable supporting frame is in said lying position, said adjustable supporting frame and said main supporting frame are substantially aligned so that said foldable bottom panel is laid flat on said adjustable supporting frame and said main supporting frame, wherein when said adjustable supporting frame is in said first inclined position, said adjustable supporting frame is pivotally moved up and maintained at a first predetermined angle of inclination with respect to said first tubular member and said second tubular member, said adjustable supporting frame being connected to said main supporting frame to further move in a second inclined position, wherein in said second inclined position, said adjustable supporting frame is pivotally and upwardly extended from said main supporting frame at a second predetermined angle of inclination, wherein said first predetermined angle of inclination is larger than said second predetermined angle of inclination.

18. The pet stroller, as recited in claim 4, wherein said utility frame further comprises a slidable frame and a pivotal frame pivotally connected to said pivotal frame, said slidable frame slidably connecting to said first tubular frame and said second tubular, said pivotal frame pivotally connecting to said slidable frame for being pivotally moved and maintained at a position corresponding to said front opening, said slidable frame being arranged to be slid out for supporting said pivotal frame at said front opening when said pet stroller is fully unfolded, and for supporting said pivotal frame as a handle when said pet stroller is fully folded.

19. The pet stroller, as recited in claim 15, wherein said utility frame further comprises a slidable frame and a pivotal frame pivotally connected to said pivotal frame, said slidable frame slidably connecting to said first tubular frame and said second tubular, said pivotal frame pivotally connecting to said slidable frame for being pivotally moved and maintained at a position corresponding to said front opening, said slidable frame being arranged to be slid out for supporting said pivotal frame at said front opening when said pet stroller is fully unfolded, and for supporting said pivotal frame as a handle when said pet stroller is fully folded.

20. The pet stroller, as recited in claim 17, wherein said utility frame further comprises a slidable frame and a pivotal frame pivotally connected to said pivotal frame, said slidable frame slidably connecting to said first tubular frame and said second tubular, said pivotal frame pivotally connecting to said slidable frame for being pivotally moved and maintained at a position corresponding to said front opening, said slidable frame being arranged to be slid out for supporting said pivotal frame at said front opening when said pet stroller is fully unfolded, and for supporting said pivotal frame as a handle when said pet stroller is fully folded.

* * * * *